United States Patent
Duan et al.

(10) Patent No.: US 9,516,569 B2
(45) Date of Patent: Dec. 6, 2016

(54) HANDOVER METHOD, SYSTEM, AND DEVICE

(71) Applicant: Huawei Device Co., Ltd., Shenzhen, Guangdong (CN)

(72) Inventors: Xiaoyan Duan, Beijing (CN); Hui Jin, Beijing (CN); Chenliang Gao, Beijing (CN); Qiang Yi, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 109 days.

(21) Appl. No.: 14/331,889

(22) Filed: Jul. 15, 2014

(65) Prior Publication Data

US 2014/0348131 A1 Nov. 27, 2014

Related U.S. Application Data

(63) Continuation of application No. PCT/CN2013/077874, filed on Jun. 25, 2013.

(30) Foreign Application Priority Data

Jun. 25, 2012 (CN) .......................... 2012 1 0209845

(51) Int. Cl.
*H04W 36/30* (2009.01)
*H04W 36/00* (2009.01)
(Continued)

(52) U.S. Cl.
CPC ......... *H04W 36/30* (2013.01); *H04W 36/0061* (2013.01); *H04W 36/14* (2013.01); *H04W 84/12* (2013.01)

(58) Field of Classification Search
CPC .. H04W 36/14; H04W 36/0061; H04W 36/30; H04W 84/11; H04W 28/26; H04L 12/14
See application file for complete search history.

(56) References Cited

U.S. PATENT DOCUMENTS

| 8,942,763 B2 * | 1/2015 | Mildh ............................ 455/411 |
| 2008/0212542 A1 * | 9/2008 | Kung ................ H04W 36/0005 370/336 |

(Continued)

FOREIGN PATENT DOCUMENTS

| CN | 101472306 A | 7/2009 |
| CN | 101473677 A | 7/2009 |

(Continued)

OTHER PUBLICATIONS

"$3^{rd}$ Generation Partnership Project; Technical Specification Group Services and System Aspects; 3GPP system to Wireless Local Area Network (WLAN) interworking; System description (Release 10)," 3GPP TS 23.234, V10.0.0, pp. 1-84, $3^{rd}$ Generation Partnership Project, Valbonne, France (Mar. 2011).

(Continued)

*Primary Examiner* — Thai Nguyen
*Assistant Examiner* — Phong La
(74) *Attorney, Agent, or Firm* — Leydig, Voit & Mayer, Ltd.

(57) ABSTRACT

Embodiments of the present invention provide a handover method performed by a source access network device, which includes: sending, a handover request or a WLAN offload request to a UE, so that the UE determines information about a target AP according to AP information corresponding to a target RAN and information about a currently accessed AP, and sends a WLAN offload binding request carrying the information about the target AP to a target access network device in the target RAN, so as to complete a RAN handover, where the handover request or the WLAN offload request includes the AP information corresponding to the target RAN, and the AP information corresponding to the target RAN is information about an AP in a WLAN that covers, together with the target RAN, a location of the UE;

(Continued)

A source access network device sends a handover request or a WLAN offload request of a handover process to a UE, so that the UE determines information about a target AP according to AP information corresponding to a target RAN and information about an AP currently accessed by the UE, and sends a WLAN offload binding request carrying the information about the target AP to a target access network device in the target RAN, so as to complete a RAN handover — 101

The source access network device receives a handover response or a WLAN offload response returned by the UE — 102 and receiving a handover response or a WLAN offload response returned by the UE.

26 Claims, 12 Drawing Sheets

(51) Int. Cl.
*H04W 36/14* (2009.01)
*H04W 84/12* (2009.01)

(56) References Cited

U.S. PATENT DOCUMENTS

| | | | |
|---|---|---|---|
| 2009/0247150 A1 | 10/2009 | Fischer et al. | |
| 2010/0118830 A1* | 5/2010 | Stephenson | H04L 63/10 370/331 |
| 2010/0124202 A1* | 5/2010 | Muppalla | H04W 28/06 370/331 |
| 2010/0240371 A1* | 9/2010 | Cook | H04W 36/0083 455/436 |
| 2011/0075675 A1* | 3/2011 | Koodli | H04L 12/14 370/401 |
| 2011/0128862 A1* | 6/2011 | Kallin | H04W 36/22 370/245 |
| 2011/0176511 A1* | 7/2011 | Sayeedi | H04W 36/0016 370/331 |
| 2011/0189995 A1* | 8/2011 | Tinnakornsrisuphap | H04W 36/0061 455/436 |
| 2011/0222523 A1 | 9/2011 | Fu et al. | |
| 2011/0305220 A1* | 12/2011 | Lindoff | H04W 28/26 370/331 |
| 2012/0020204 A1* | 1/2012 | Morera | H04W 48/18 370/217 |
| 2012/0023189 A1* | 1/2012 | Giaretta | H04W 48/18 709/217 |
| 2012/0142278 A1* | 6/2012 | Wang | H04W 76/041 455/68 |
| 2012/0263145 A1* | 10/2012 | Marinier | H04W 36/22 370/331 |
| 2012/0269134 A1* | 10/2012 | Jin | H04W 28/085 370/328 |
| 2013/0029719 A1* | 1/2013 | Choi | H04W 4/003 455/525 |
| 2013/0083661 A1* | 4/2013 | Gupta | H04W 4/005 370/235 |
| 2013/0242965 A1* | 9/2013 | Horn | H04W 24/10 370/338 |
| 2013/0288681 A1* | 10/2013 | Hamalainen | H04W 36/0061 455/436 |
| 2014/0119267 A1* | 5/2014 | Santhanam | H04W 4/06 370/312 |
| 2014/0133298 A1* | 5/2014 | Han | H04W 28/0289 370/230 |
| 2014/0148174 A1* | 5/2014 | Teyeb | H04W 36/0083 455/441 |
| 2014/0204909 A1* | 7/2014 | Cheng | H04W 8/082 370/331 |
| 2014/0370897 A1* | 12/2014 | Vesterinen | H04W 36/08 455/436 |
| 2014/0376515 A1* | 12/2014 | Lei | H04W 36/0061 370/331 |
| 2014/0378131 A1* | 12/2014 | Rui | H04L 41/0893 455/433 |
| 2015/0319653 A1 | 11/2015 | Wang et al. | |

FOREIGN PATENT DOCUMENTS

| | | |
|---|---|---|
| CN | 101883361 A | 11/2010 |
| CN | 101345999 B | 2/2011 |
| CN | 102131265 A | 7/2011 |
| CN | 102215459 A | 10/2011 |
| EP | 2224640 A1 | 9/2010 |
| EP | 2879432 A1 | 6/2015 |
| WO | WO 2007149509 A2 | 12/2007 |

OTHER PUBLICATIONS

"3$^{rd}$ Generation Partnership Project; Technical Specification Group Services and System Aspects; Architecture enhancements for non-3GPP accesses (Release 11)," 3GPP TS 23.402, V11.1.0, pp. 1-232, 3$^{rd}$ Generation Partnership Project, Valbonne, France (Dec. 2011).

"3$^{rd}$ Generation Partnership Project; Technical Specification Group Services and System Aspects; IP flow mobility and seamless Wireless Local Area Network (WLAN) offload; Stage 2 (Release 10)," 3GPP TS 23.261, V10.2.0, pp. 1-22, 3$^{rd}$ Generation Partnership Project, Valbonne, France (Mar. 2012).

"WiFi Optimized Offloading in 3GPP RAT Mobility," S2-121455 (Apr. 16, 2012).

"Interaction of ANDSF with enhanced policy framework," 3GPP TSG SA WG2 Meeting #80, TD S2-103526, Brunstad, Norway, 3$^{rd}$ Generation Partnership Project, Valbonne, France (Aug. 30-Sep. 3, 2010).

2$^{nd}$ Office Action and Search Report in corresponding Chinese Application No. 201210209845 (Aug. 25, 2016).

* cited by examiner

HANDOVER METHOD, SYSTEM, AND DEVICE

CROSS-REFERENCE TO RELATED APPLICATION

This application is a continuation of International Patent Application No. PCT/CN2013/077874, filed on Jun. 25, 2013, which claims priority to Chinese Patent Application No. 201210209845.2, filed on Jun. 25, 2012, which are hereby incorporated by reference in their entireties.

TECHNICAL FIELD

The present invention relates to communications technologies, and in particular, to a handover method, system, and device.

BACKGROUND

A mobile communications network for which the 3rd Generation Partnership Project (3rd Generation Partnership Project, 3GPP for short) standard organization defines a technical standard, hereinafter referred to as a mobile communications network or a 3GPP network, is currently the most commonly used wireless mobile communications network. A user accesses a mobile communications network by using a user equipment (User Equipment, UE for short), and makes an audio or video call with another user, sends a message, or logs in to the Internet to browse a web page or download data. As smartphones and some new data applications emerge, a capacity of the mobile communications network is faced up with growing challenges. Therefore, operators start to consider combining a mobile communications network with a wireless local area network (Wireless Local Area Network, WLAN for short), so as to provide better services for users.

Currently, a method for combining a mobile communications network and a WLAN is mainly as follows: A radio access network (Radio Access Network, RAN for short) of a mobile communications network sends, to a UE, information about access points (Access Point, AP for short) in a WLAN that covers, together with the RAN, a location of the UE; and the UE selects an appropriate AP according to the AP information and implements WLAN access by accessing the selected AP. When the UE undergoes a handover to another mobile communications network, for example, the UE moves to a new RAN, the UE disconnects from a WLAN connection with the original AP. After the UE is handed over from a source RAN to a target RAN, the target RAN sends, to the UE, information about APs in a WLAN that covers, together with the target RAN, the UE. The UE re-selects an appropriate AP according to the AP information that is sent by the target RAN, implements WLAN access again by accessing the selected AP, and further implements WLAN offload under the new RAN. WLAN offload (WiFi Offload) is to transmit, through WLAN access, service data that originally needs to be transmitted through a 3GPP access network, so as to reduce load on the 3GPP network.

It can be seen from the foregoing description that, when a UE undergoes a handover to another mobile communications network (that is, the UE is handed over from a source RAN to a target RAN) and after the UE is handed over to the target RAN, the target RAN needs to send, to the UE, information about APs in a WLAN that covers, together with the target RAN, the UE, so as to re-establish WLAN offload. As a result, time for re-establishing WLAN offload is relatively long, and data transmission interruption or packet loss will possibly occur, which affects service continuity.

SUMMARY

Embodiments of the present invention provide a handover method, system, and device, which are used in a case that a mobile communications network is combined with a WLAN to reduce handover time in which a UE is handed over from a source RAN to a target RAN, and reduce an impact on service continuity.

In a first aspect, a handover method is provided, including:

sending, by a source access network device, a handover request or a wireless local area network WLAN offload request to a user equipment UE, so that the UE determines information about a target AP according to access point AP information corresponding to a target radio access network RAN and information about a currently accessed AP, and sends a WLAN offload binding request carrying the information about the target AP to a target access network device in the target RAN, so as to complete a RAN handover, where the handover request or the WLAN offload request includes the AP information corresponding to the target RAN, and the AP information corresponding to the target RAN is information about an AP in a WLAN that covers, together with the target RAN, a location of the UE; and receiving, by the source access network device, a handover response or a WLAN offload response returned by the UE.

In a second aspect, a handover method is provided, including:

receiving, by a user equipment UE, a handover request or a wireless local area network WLAN offload request sent by a source access network device, where the handover request or the WLAN offload request includes access point AP information corresponding to a target radio access network RAN, the target RAN is a RAN to which a target access network device belongs, and the AP information corresponding to the target RAN is information about an AP in a WLAN that covers, together with the target RAN, a location of the UE;

determining, by the UE, information about a target AP according to the AP information corresponding to the target RAN and information about an AP currently accessed by the UE;

sending, by the UE, a handover response or a WLAN offload response to the source access network device; and sending, by the UE, a WLAN offload binding request to the target access network device, so as to complete a RAN handover, where the WLAN offload binding request includes the information about the target AP.

In a third aspect, a handover method is provided, including:

receiving, by a target access network device, a wireless local area network WLAN offload binding request sent by a user equipment UE, where the WLAN offload binding request includes information about a target access point AP, the information about the target AP is determined by the UE according to AP information that is corresponding to a target radio access network RAN and sent by a source access network device and information about an AP currently accessed by the UE, the target RAN is a RAN to which the target access network device belongs, and the AP information corresponding to the target RAN is information about an AP in a WLAN that covers, together with the target RAN, a location of the UE;

sending, by the target access network device, a WLAN offload policy command to the UE, so that the UE sends service data to the target AP and/or receives service data sent by the target AP according to a WLAN offload policy, where the WLAN offload policy command includes the WLAN offload policy; and receiving, by the target access network device, a WLAN offload policy acknowledgement sent by the UE.

In a fourth aspect, an access network device is provided, including:

a first transmitter, configured to send a handover request or a wireless local area network WLAN offload request to a user equipment UE, so that the UE determines information about a target AP according to access point AP information corresponding to a target radio access network RAN and information about a currently accessed AP, and sends a WLAN offload binding request carrying the information about the target AP to a target access network device in the target RAN, so as to complete a RAN handover, where the handover request or the WLAN offload request includes the AP information corresponding to the target RAN, and the AP information corresponding to the target RAN is information about an AP in a WLAN that covers, together with the target RAN, a location of the UE; and a first receiver, configured to, after the first transmitter sends the handover request or the WLAN offload request, receive a handover response or a WLAN offload response returned by the UE.

In a fifth aspect, a user equipment is provided, including:

a second receiver, configured to receive a handover request or a wireless local area network WLAN offload request sent by a source access network device, where the handover request or the WLAN offload request includes access point AP information corresponding to a target radio access network RAN, the target RAN is a RAN to which a target access network device belongs, and the AP information corresponding to the target RAN is information about an AP in a WLAN that covers, together with the target RAN, a location of the UE;

a processor, configured to receive the handover request or the WLAN offload request from the second receiver, and determine information about a target AP according to the AP information corresponding to the target RAN in the handover request or the WLAN offload request and information about an AP currently accessed by the UE; and a second transmitter, configured to, after the second receiver receives the handover request or the WLAN offload request, send a handover response or a WLAN offload response to the source access network device, and after the processor determines the information about the target AP, send a WLAN offload binding request to the target access network device, so as to complete a RAN handover, where the WLAN offload binding request includes the information about the target AP.

In a sixth aspect, an access network device is provided, including:

a third receiver, configured to receive a wireless local area network WLAN offload binding request sent by a user equipment UE, where the WLAN offload binding request includes information about a target access point AP, the information about the target AP is determined by the UE according to AP information that is corresponding to a target radio access network RAN and sent by a source access network device and information about an AP currently accessed by the UE, the target RAN is a RAN to which the access network device belongs, and the AP information corresponding to the target RAN is information about an AP in a WLAN that covers, together with the target RAN, a location of the UE; and a third transmitter, configured to, after the third receiver receives the WLAN offload binding request, send a WLAN offload policy command to the UE, so that the UE sends service data to the target AP and/or receives service data sent by the target AP according to a WLAN offload policy, where the WLAN offload policy command includes the WLAN offload policy; and the third receiver is further configured to, after the third transmitter sends the WLAN offload policy command, receive a WLAN offload policy acknowledgement sent by the UE.

In a seventh aspect, a handover system is provided, including: a source access network device, a user equipment, and a target access network device, where:

the source access network device is any one of the access network devices provided in the fourth aspect of the embodiments of the present invention; the user equipment is any one of the user equipments provided in the fifth aspect of the embodiments of the present invention; and the target access network device is any one of the access network devices provided in the sixth aspect of the embodiments of the present invention.

By using the handover method, system, and device provided in the embodiments of the present invention, in a process of handover from a source access network device to a target access network device, the source access network device provides, for a UE, AP information corresponding to a target RAN to which the target access network device belongs, so that the UE can determine information about a target AP according to the AP information that is corresponding to the target RAN and provided by the source access network device and information about an AP currently accessed by the UE, add the information about the target AP to a WLAN offload binding request, and send the WLAN offload binding request to the target access network device, so as to complete a RAN handover. Unlike the prior art where handover to the target access network device needs to be first performed, and then the information about the target AP is determined according to AP information that is corresponding to the target RAN and provided by the target access network device, this reduces time for determining the target AP, and helps reduce time of an entire handover process and reduce an impact of the handover process on service continuity.

BRIEF DESCRIPTION OF DRAWINGS

To describe the technical solutions in the embodiments of the present invention more clearly, the following briefly introduces accompanying drawings required for describing the embodiments. Apparently, the accompanying drawings in the following description show some embodiments of the present invention, and persons of ordinary skill in the art may still derive other drawings according to these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the embodiments to be described are a part rather than all of the embodiments of the present invention. All other embodiments acquired by persons of ordinary skill in the art based on the embodiments of the present invention without creative efforts shall fall within the protection scope of the present invention.

In the following embodiments of the present invention, in a macro site scenario (that is, a RAN includes both a radio network controller (Radio Network Controller, RNC for short) and a base station (NodeB, NB for short)), an access network device is the RNC; and in a small-cell base station scenario (that is, a RAN includes only an NB), an access network device is the NB. The access network device may be a source access network device, or may also be a target access network device. In addition, both the source access network device and the target access network device may be RNCs or NBs; or one may be an RNC, and the other is an NB.

In the following embodiments of the present invention, information about an AP is mainly information that can uniquely identify the AP, but is not limited thereto. For example, information about an AP may include an extended service set identifier (Extended Service Set Identifier, ESSID for short), a basic service set identifier (Basic Service Set Identifier, BSSID for short), an authentication manner, a key management type, a password, and like information of the AP.

A handover method provided in the following embodiments of the present invention mainly describes a handover process in which a UE moves from a RAN to another RAN in a scenario where a mobile communications network is combined with a WLAN.

Figure 1:
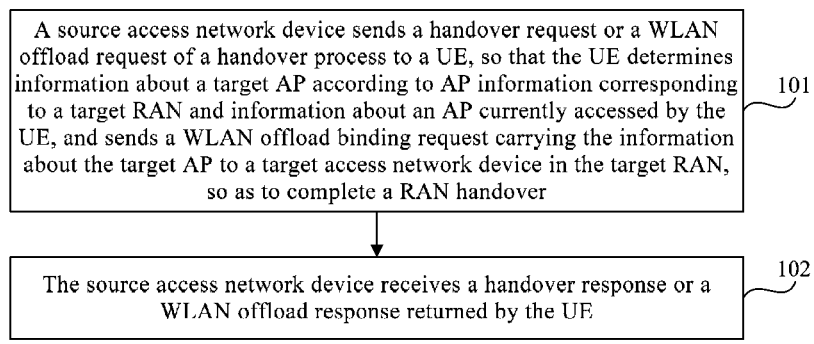
FIG. 1 is a flowchart of a handover method according to an embodiment of the present invention.

FIG. 1 is a flowchart of a handover method according to an embodiment of the present invention. As shown in FIG. 1, the method provided in this embodiment includes:

Step 101: A source access network device sends a handover request or a WLAN offload request of a handover process to a UE, so that the UE determines information about a target AP according to AP information corresponding to a target RAN and information about an AP currently accessed by the UE, and sends a WLAN offload binding request carrying the information about the target AP to a target access network device in the target RAN, so as to complete a RAN handover.

The source access network device may send the WLAN offload request of a handover process to the UE before sending the handover request; or while sending the handover request, which means that the WLAN offload request is included in the handover request. If the WLAN offload request is independently sent before the source access network device sends the handover request to the UE, the WLAN offload request may carry a handover instruction.

The handover request or the WLAN offload request includes the AP information corresponding to the target RAN. The AP information corresponding to the target RAN is information about an AP in a WLAN that covers, together with the target RAN, a location of the UE. In this embodiment, a RAN to which a target access network device belongs is called a target RAN, and a RAN to which a source access network device belongs is called a source RAN.

Step 102: The source access network device receives a handover response or a WLAN offload response returned by the UE.

Specifically, after the source access network device decides to initiate a RAN handover process, the source access network device sends a handover request to the UE. After receiving the handover request, the UE returns a handover response to the source access network device. Optionally, in the process, the source access network device may add the acquired AP information corresponding to a target RAN to the handover request and send the handover request to the UE, so that the UE processes a WLAN access process in a handover process and prepares for data offload using a WLAN.

Further, in a scenario where a mobile communications network is combined with a WLAN, in a handover process, the source access network device further sends a WLAN offload request to the UE, so as to request the UE to process a WLAN access process in the handover process and prepare for data offload using the WLAN. The WLAN offload request may be sent together with the handover request, that is, the WLAN offload request is included in the handover request; or the WLAN offload request is independently sent before the source access network device sends the handover request to the UE. If the WLAN offload request is independently sent before the source access network device sends the handover request to the UE, the WLAN offload request may carry a handover instruction.

After receiving the WLAN offload request, the UE returns a WLAN offload response to the source access network device. Optionally, in the process, the source access network device may send the acquired AP information corresponding to a target RAN to the UE.

In this embodiment, after receiving the AP information that is corresponding to the target RAN and sent by the source access network device, the UE determines the information about the target RAN according to the AP information corresponding to the target RAN and the information about the AP currently accessed by the UE, where the target AP is an AP used by the UE after the UE accesses the target RAN, that is, an AP accessed by the UE in the target RAN. The target AP may be an AP currently accessed by the UE, or may be an AP corresponding to information about a certain AP that is selected from the AP information corresponding to the target RAN. In the prior art, however, a UE needs to first disconnect from a current AP, and receive, after being handed over to a target RAN, AP information corresponding to the target RAN that is sent by a target access network device, before determining a target AP and information about the target AP according to the AP information that is corresponding to the target RAN and sent by the target access network device. It can be seen that, compared with the prior art, in this embodiment, time for a UE to determine information about a target AP can be reduced, which helps reduce time of an entire handover process and reduce an impact of the handover process on service continuity.

After determining the information about the target AP, the UE continues to execute the RAN handover process until the UE is successfully handed over to the target RAN, and sends a WLAN offload binding request to the target access network device, so as to complete a RAN handover. The UE sends the WLAN offload binding request to the target access network device and adds the information about the target AP to the WLAN offload binding request, so that the target access network device executes the following operations: authenticating the target AP, that is, determining whether to allow the UE to access the target AP; and/or, determining a WLAN offload policy according to the information about the target AP; and/or allocating an IP address to the UE, and the like. Further, the UE may further receive a WLAN offload binding response sent by the target access network device, where the WLAN offload binding response carries information such as an IP address allocated by the target access network device to the UE. The IP address is an IP address used by the UE in the target RAN.

Optionally, if the target AP determined by the UE is different from an AP currently accessed by the UE, in this case, the UE may disconnect from the currently accessed AP in time, and access the target AP. A process in which the UE disconnects from the currently accessed AP and accesses the target AP may be executed in parallel with a process in which the UE is handed over to the target RAN. In the prior art, however, a UE needs to first disconnect from a currently accessed AP, and receive, after being handed over to a target RAN, AP information corresponding to the target RAN that is sent by a target access network device, before determining a target AP and information about the target AP according to the AP information that is corresponding to the target RAN and sent by the target access network device. It can be seen that, compared with the prior art, in a case that a determined target AP is different from an AP currently accessed by a UE, in this embodiment, time for a UE to accessing a target AP can be reduced, which helps shorten time for re-establishing WLAN offload in the target RAN and ease a problem of packet loss or transmission interruption in a process of disconnecting from an original AP and accessing a new target AP again; and the original sequential execution is changed to parallel execution, which helps reduce time of an entire handover process and reduce an impact of the handover process on service continuity.

The handover method provided in this embodiment of the present invention is described from the perspective of a source access network device or, in other words, a source RAN. In this embodiment, a source access network device sends acquired AP information corresponding to a target RAN to a UE by using a handover request or a WLAN offload request, so that the UE can determine information about a target AP according to the AP information that is corresponding to the target RAN and provided by the source access network device and information about an AP currently accessed by the UE, add the information about the target AP to a WLAN offload binding request, and send the WLAN offload binding request to a target access network device, so as to complete a RAN handover. Unlike the prior art where handover to the target access network device needs to be first performed, and then the information about the target AP is determined according to AP information that is corresponding to the target RAN and provided by the target access network device, this reduces time for determining the target AP, and helps reduce time of an entire handover process and reduce an impact of the handover process on service continuity. Further, in a case that the target AP needs to be accessed again, in this embodiment, the target AP can be accessed in time, which helps shorten time for re-establishing WLAN offload in the target RAN and ease a problem of packet loss or transmission interruption in a process of disconnecting from an original AP and accessing a target AP again; and the original sequential execution is changed to parallel execution, which further helps reduce time of an entire handover process and reduce an impact of the handover process on service continuity.

Figure 2:
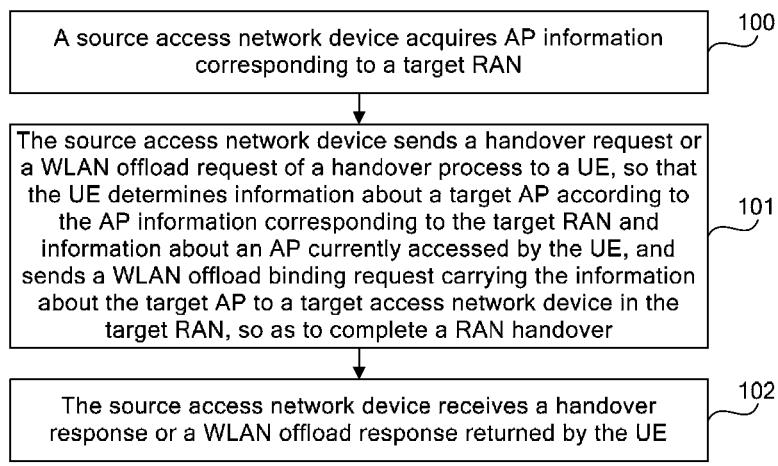
FIG. 2 is a flowchart of a handover method according to another embodiment of the present invention.

FIG. 2 is a flowchart of a handover method according to another embodiment of the present invention. This embodiment is implemented based on the embodiment shown in FIG. 1. As shown in FIG. 2, before step 101, the method provided in this embodiment includes:

Step 100: The source access network device acquires the AP information corresponding to the target RAN.

Figure 3:
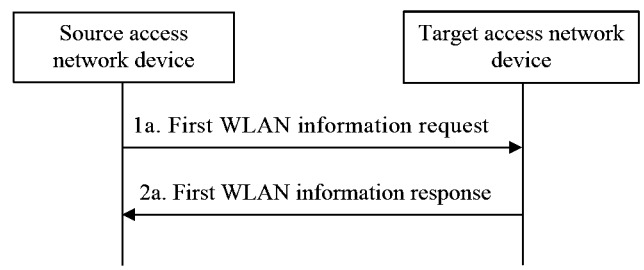
FIG. 3 is a flowchart of an optional implementation manner of step 100.

As shown in FIG. 3, an optional implementation manner of step 100 includes:

Step 1*a*: The source access network device sends a first WLAN information request to the target access network device.

Step 2*a*: The source access network device receives a first WLAN information response returned by the target access network device, where the first WLAN information response includes the AP information corresponding to the target RAN.

In the implementation manner shown in FIG. 3, access network devices may interact with each other. By interaction, one access network device may learn the following information of another: AP information corresponding to a RAN to which the other belongs. The AP information corresponding to a RAN to which the other belongs is information about an AP in a WLAN that covers, together with the RAN to which the other belongs, the location of the UE.

Optionally, in the implementation manner shown in FIG. 3, a function of using an access network device to implement signaling interaction related to WLAN offload is called a RAN application-based WLAN offload (Offload) function. Based on this, an access network device may learn, by interaction, the following information of another: whether the other supports the RAN application-based WLAN Offload function; and may learn AP information corresponding to a RAN to which the other belongs when the other supports the RAN application-based WLAN Offload function.

Further, optionally, the source access network device may add the AP information corresponding to the source RAN to the first WLAN information request and send the first WLAN information request to the target access network device. That is, the first WLAN information request includes the AP information corresponding to the source RAN, where the AP information corresponding to the source RAN is information about an AP in a WLAN that covers, together with the source RAN, the location of the UE.

Further, optionally, the source access network device may add instruction information requesting AP information corresponding to the target RAN to the first WLAN information request, and then send the first WLAN information request carrying the instruction information to the target access network device. That is, the first WLAN information request includes the instruction information requesting the AP information corresponding to the target RAN.

Further, optionally, the source access network device may add the AP information corresponding to the source RAN to the first WLAN information request, and add instruction information requesting AP information corresponding the target RAN to the WLAN information request. That is, the first WLAN information request includes the AP information corresponding to the source RAN and the instruction information requesting the AP information corresponding to the target RAN.

Figure 4:
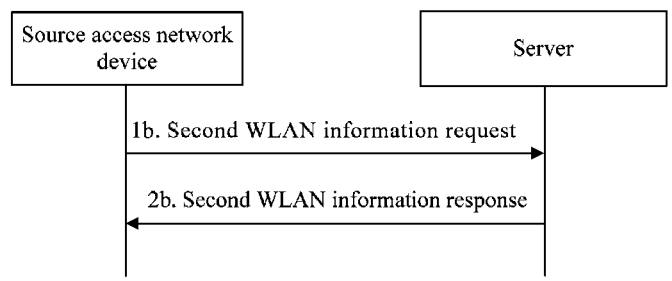
FIG. 4 is a flowchart of another optional implementation manner of step 100.

As shown in FIG. 4, another optional implementation manner of step 100 includes:

Step 1b: The source access network device sends a second WLAN information request to a server, where the second WLAN information request includes an identifier of a target access network device.

Step 2b: The source access network device receives a second WLAN information response returned by the server, where the second WLAN information response includes AP information corresponding to a target RAN, which is acquired by the server by querying according to the identifier of the target access network device.

In the implementation manner shown in FIG. 4, a server is pre-disposed on a network or the following function is implemented/added on an existing server: configuring information about APs in a RAN and a WLAN in a certain area, that is, the server pre-stores an association between the information about the APs in the RAN and the WLAN. In this way, an access network device may query the server, so as to acquire AP information corresponding to a RAN to which an adjacent access network device belongs. Further, the access network device may also learn, by querying the server, information such as whether an adjacent access network device supports a RAN application-based WLAN Offload function. The existing server may be, for example, a domain name system (Domain Name System, DNS for short) server, but is not limited thereto.

In the foregoing association, an identifier of the access network device and corresponding AP information are stored. The identifier of the access network device may be, for example, an ID, an IP address, or a fully qualified domain name (Fully Qualified Domain Name, FQDN for short) of the access network device. The AP information may include but is not limited to a service set identifier (Service Set Identifier, SSID for short).

Based on the foregoing description, the implementation manner shown in FIG. 4 is specifically as follows: the source access network device adds an identifier of a target access network device to a second WLAN information request and sends the second WLAN information request to a sever; after receiving the second WLAN information request, the server acquires the identifier of the target access network device from the second WLAN information request, searches an association according to the identifier of the target access network device, so as to acquire information about APs corresponding to the identifier of the target access network device, adds the information about the APs, as AP information corresponding to a target RAN, to a second WLAN information response, and returns the second WLAN information response to the source access network device.

Still another optional implementation manner of step 100 includes the following: the source access network device acquires AP information corresponding to a target RAN from the source access network device. The implementation manner is especially applicable to a small-cell base station scenario, that is, AP information corresponding to a RAN to which an adjacent access network device belongs is directly configured on an access network device. Further, capability information whether the adjacent access network device supports a RAN application-based WLAN Offload function may also be configured on the access network device. Based on this, the source access network device may directly acquire, from a local position, AP information corresponding to a target RAN to which a target access network device belongs.

It can be seen from the foregoing description that the implementation manners provided in this embodiment for a source access network device to acquire AP information corresponding to a target RAN are simple and easy to implement.

Further, in the foregoing embodiments, before step 101, the method further includes:

Step 10a: The source access network device decides to initiate a RAN handover process.

Step 10a may be executed before step 100, or may be executed after step 100. If 10a is executed before step 100, the source access network device acquires the AP information corresponding to the target RAN in a handover process; and if step 10a is executed after step 100, the source access network device acquires the AP information corresponding to the target RAN before the handover.

Figure 5:
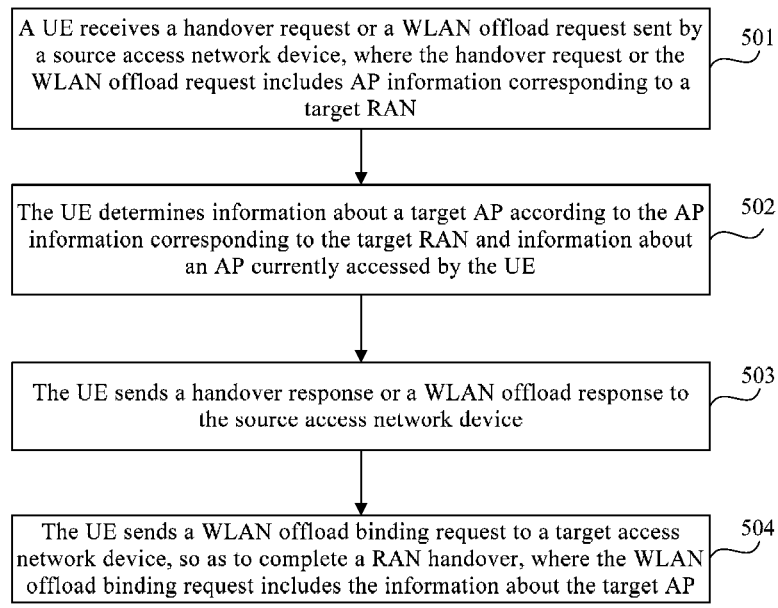
FIG. 5 is a flowchart of a handover method according to still another embodiment of the present invention.

FIG. 5 is a flowchart of a handover method according to still another embodiment of the present invention. As shown in FIG. 5, the method provided in this embodiment includes:

Step 501: A UE receives a handover request or a WLAN offload request sent by a source access network device, where the handover request or the WLAN offload request includes AP information corresponding to a target RAN.

In this embodiment, the target RAN is a RAN to which a target access network device belongs, and a source RAN is a RAN to which the source access network device belongs. The AP information corresponding to the target RAN is information about an AP in a WLAN that covers, together with the target RAN, a location of the UE.

Step 502: The UE determines information about a target AP according to the AP information corresponding to the target RAN and information about an AP currently accessed by the UE.

Step 503: The UE sends a handover response or a WLAN offload response to the source access network device.

Step 504: The UE sends a WLAN offload binding request to the target access network device, so as to complete a RAN handover, where the WLAN offload binding request includes the information about the target AP.

Specifically, when the source access network device decides to initiate a RAN handover process, the source access network device sends a handover request to the UE. After receiving the handover request, the UE returns a handover response to the source access network device. Optionally, in the process, the source access network device may add the acquired AP information corresponding to the target RAN to the handover request and send the handover request to the UE, so that the UE processes a WLAN access process in a handover process and prepares for data offload using a WLAN. Based on this, after receiving the handover request, the UE acquires the AP information corresponding to the target RAN from the handover request, determines the information about the target AP according to the AP information corresponding to the target RAN and the information about the AP currently accessed by the UE, and then returns the handover response to the source access network device.

The target AP is an AP that needs to be accessed by the UE in the target RAN. The target AP may be the AP currently accessed by the UE, or may be an AP corresponding to information about a certain AP that is selected from the AP information corresponding to the target RAN.

Further, in a scenario where a mobile communications network is combined with a WLAN, in a handover process, the source access network device further sends a WLAN offload request to the UE, so as to request the UE to process a WLAN access process in the handover process and prepare for data offload using the WLAN. The WLAN offload request may be sent together with the handover request, that is, the WLAN offload request is included in a handover request message; or the WLAN offload request is independently sent before the source access network device sends the handover request to the UE. If the WLAN offload request is independently sent before the source access network device sends the handover request to the UE, the WLAN offload request may carry a handover instruction. After receiving the WLAN offload request, the UE returns a WLAN offload response to the source access network device. Optionally, in the process, the source access network device may send the acquired AP information corresponding to the target RAN to the UE. Based on this, after receiving the WLAN offload request, the UE acquires the AP information corresponding to the target RAN from the WLAN offload request, determines the information about the target AP according to the AP information corresponding to the target RAN and the information about the AP currently accessed by the UE, and then returns the WLAN offload response to the source access network device.

In this embodiment, after receiving the AP information that is corresponding to the target RAN and sent by the source access network device, the UE determines the information about the target AP according to the AP information corresponding to the target RAN and the information about the AP currently accessed by the UE. In the prior art, however, a UE needs to first disconnect from a current AP, and receive, after being handed over to a target RAN, AP information that is corresponding to the target RAN and sent by a target access network device, before determining a target AP and information about the target AP according to the AP information that is corresponding to the target RAN and sent by the target access network device. It can be seen that, compared with the prior art, in this embodiment, time for a UE to determine information about a target AP can be reduced, which helps reduce time of an entire handover process and reduce an impact of the handover process on service continuity.

Further, after the UE is successfully handed over to the target RAN, the UE sends the WLAN offload binding request to the target access network device, where the WLAN offload binding request includes the information about the target AP, so as to complete a RAN handover.

In an optional implementation manner of this embodiment, step 502 specifically includes the following:

If the AP information corresponding to the target RAN includes the information about the AP currently accessed by the UE, and a signal strength of the AP currently accessed by the UE is greater than or equal to a preset signal threshold, the UE retains a connection with the AP currently accessed by the UE, and determines that the information about the AP currently accessed by the UE is the information about the target AP.

In this case, it indicates that the AP currently accessed by the UE is in an adjacent area of the target RAN, and that a state of a link between the UE and the AP currently accessed by the UE is good. If the connection with the currently accessed AP is disconnected, and a new AP is accessed again, as in the prior art, the handover time will definitely be longer, service continuity may be affected, and additional resource waste may be caused. However, in the implementation manner, the UE retains the connection with the currently accessed AP and determines that the currently accessed AP is the target AP, which helps reduce a time delay for accessing a new AP again, reduce an impact on service continuity, and reduce resource waste caused by accessing the new AP again. In this case, the information about the target AP that is carried in the WLAN offload binding request sent by the UE to the target access network device is actually the information about the AP currently accessed by the UE.

If the AP information corresponding to the target RAN does not include the information about the AP currently accessed by the UE, or the AP information corresponding to the target RAN includes the information about the AP currently accessed by the UE but the signal strength of the AP currently accessed by the UE is smaller than the preset signal threshold, the UE disconnects from the AP currently accessed by the UE, and selects, from the AP information corresponding to the target RAN, information about an AP not currently accessed by the UE as the information about the target AP.

In this case, it indicates that the AP currently accessed by the UE cannot meet a WLAN offload requirement, and to ensure normal WLAN offload after handover, the UE re-selects, from the AP information corresponding to the target RAN, information about an AP as the information about the target AP. The re-selected information about an AP is different from the information about the AP currently accessed by the UE.

A preferential implementation manner for the UE to select, from the AP information corresponding to the target RAN, information about an AP not currently accessed by the UE as the information about the target AP includes the following: the UE performs WLAN scanning, so as to acquire signal strengths of APs corresponding to information of APs in the AP information corresponding to the target RAN; and then the UE selects, from the AP information corresponding to the target RAN, information about an AP that has a greatest signal strength and that is not currently accessed by the UE as the information about the target AP.

Further, if the information about the target AP is the information about the AP that is selected by the UE from the AP information corresponding to the target RAN and is the information about an AP not currently accessed by the UE, the method provided in this embodiment further includes the following: the UE executes, according to the information about the target AP, a process of accessing the target AP. A preferential implementation manner is as follows: after determining the information about the target AP, when being handed over to the target RAN, the UE executes, according to the information about the target AP, the process of accessing the target AP. In the implementation manner, the UE disconnects from the currently accessed AP, and carries out a process of accessing the target AP. A process in which the UE accesses the target AP can be executed in parallel with a process in which the UE is handed over to the target RAN. Compared with a process in the prior art where, after being handed over to the target RAN, the UE needs to determine the information about the target AP according to the AP information that is corresponding to the target RAN and sent by the target access network device, and then executes a process of accessing the target AP, this helps reduce time for the UE to access the target AP, shorten time for re-establishing WLAN offload in the target RAN, and ease a problem of packet loss or transmission interruption in a process of disconnecting from an original AP and accessing a target AP again. The original sequential execution is changed to parallel execution, which further helps reduce time of an entire handover process and reduce an impact of the handover process on service continuity.

Figure 6:
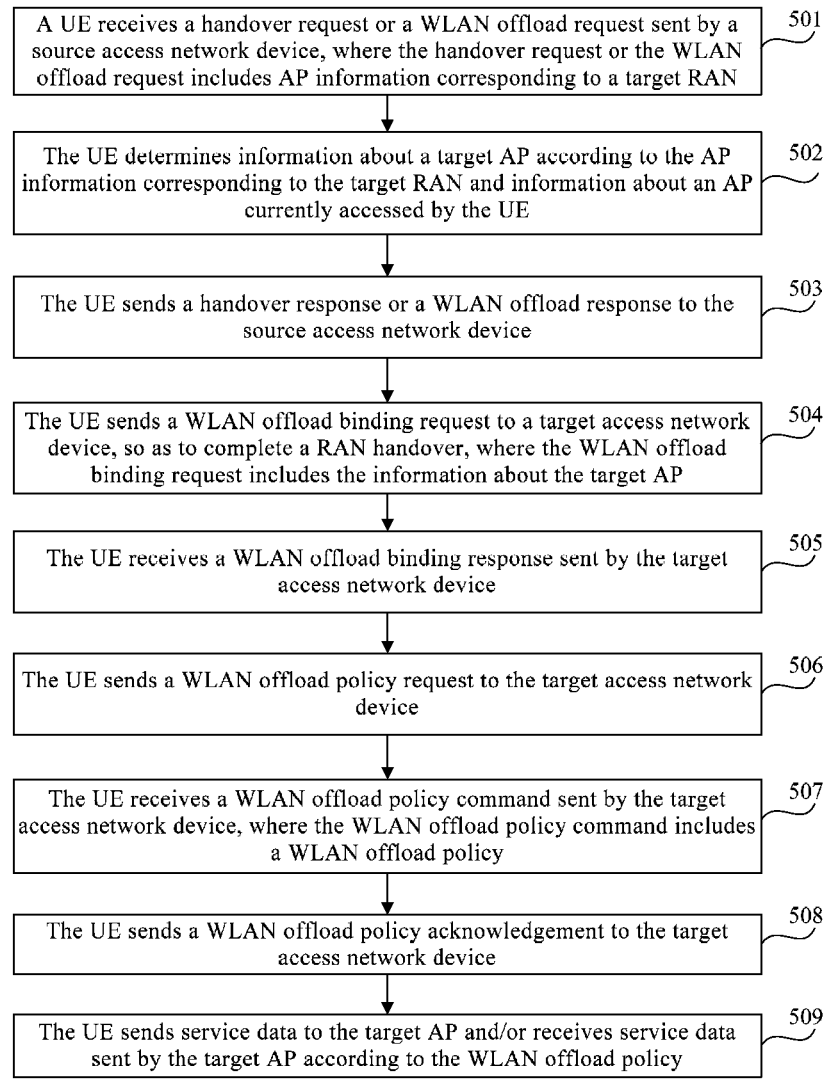
FIG. 6 is a flowchart of a handover method according to yet another embodiment of the present invention.

FIG. 6 is a flowchart of a handover method according to yet another embodiment of the present invention. This embodiment is implemented based on the embodiment shown in FIG. 5. As shown in FIG. 6, after step 504, the method provided in this embodiment further includes:

Step 507: The UE receives a WLAN offload policy command sent by the target access network device, where the WLAN offload policy command includes a WLAN offload policy.

Optionally, as shown in FIG. 6, before step 507, the method includes:

Step 505: The UE receives a WLAN offload binding response sent by the target access network device.

The offload binding response includes an IP address allocated by the target access network device to the UE, where the IP address is an IP address used by the UE in the target RAN.

Step 506: The UE sends a WLAN offload policy request to the target access network device.

The WLAN offload policy request is used to request negotiating with the target access network device on an offload priority, a granularity, proportion information, and the like.

After receiving the WLAN offload policy request of the UE, the target access network device determines a WLAN offload policy by comprehensively considering both a local policy (that is, a network side policy) and a UE side policy, and sends the determined WLAN offload policy to the UE by using a WLAN offload policy command Optionally, in the process of determining a WLAN offload policy, the target access network device may also consider the information about the target AP accessed by the UE.

Further, in addition to determining a WLAN offload policy according to the information about the target AP, the target access network device may also execute the following operations according to the information about the target AP: authenticating the target AP, that is, determining whether the UE is allowed to access the target AP; and/or allocating an IP address to the UE, and the like.

Step 508: The UE sends a WLAN offload policy acknowledgement to the target access network device.

Step 509: The UE, according to the WLAN offload policy, sends service data to the target AP and/or receives service data sent by the target AP.

Then WLAN offload continues to be performed in the target RAN, that is, the target access network device sends, according to the determined WLAN offload policy, a part of data of an ongoing service of the UE to the UE through the target AP. The UE receives, according to the WLAN offload policy, service data sent by the target AP.

The handover method provided in this embodiment is described from the perspective of a UE. In this embodiment, a UE receives AP information that is corresponding to a target RAN and sent by a source access network device by using a handover request or a WLAN offload request, determines information about a target AP according to the AP information that is corresponding to the target RAN and provided by the source access network device and information about an AP currently accessed by the UE, adds the information about the target AP to a WLAN offload binding request, and sends the WLAN offload binding request to a target access network device, so as to complete a RAN handover. Unlike the prior art where the handover to the target access network device needs to be first performed, and then the information about the target AP is determined according to AP information that is corresponding to the target RAN and provided by the target access network device, this reduces time for determining the target AP, and helps reduce time of an entire handover process and reduce an impact of the handover process on service continuity. Further, in a case that a target AP needs to be accessed again, in this embodiment, the target AP can be accessed in time, which helps shorten time for re-establishing WLAN offload in the target RAN and ease a problem of packet loss or transmission interruption in a process of disconnecting from an original AP and accessing a target AP again; and the original sequential execution is changed to parallel execution, which further helps reduce time of an entire handover process and reduce an impact of a handover process on service continuity.

Figure 7:
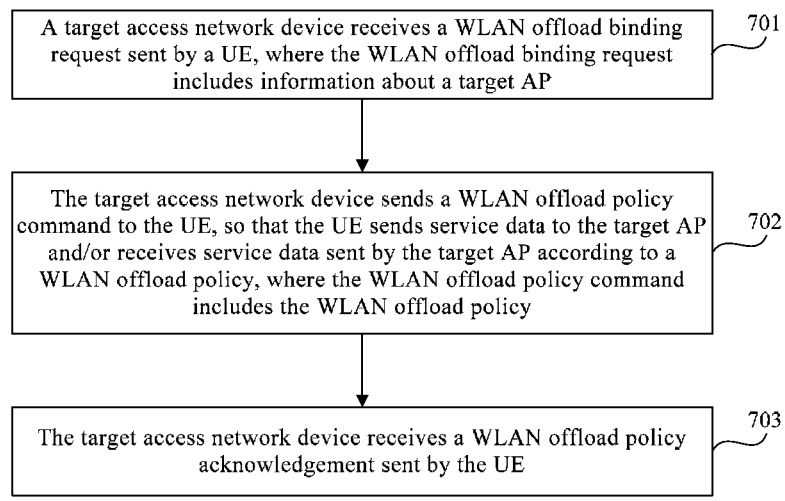
FIG. 7 is a flowchart of a handover method according to yet another embodiment of the present invention.

FIG. 7 is a flowchart of a handover method according to yet another embodiment of the present invention. As shown in FIG. 7, the method provided in this embodiment includes:

Step 701: A target access network device receives a WLAN offload binding request sent by a UE, where the WLAN offload binding request includes information about a target AP.

The information about the target AP is determined by the UE according to AP information that is corresponding to a target RAN and sent by a source access network device and information about an AP currently accessed by the UE. The AP information corresponding to the target RAN is information about an AP in a WLAN that covers, together with the target RAN, a location of the UE.

In this embodiment, a target RAN is a RAN to which a target access network device belongs, and a RAN to which a source access network device belongs is a source RAN.

Step 702: The target access network device sends a WLAN offload policy command to the UE, so that the UE sends service data to the target AP and/or receives service data sent by the target AP according to a WLAN offload policy, where the WLAN offload policy command includes the WLAN offload policy.

The target access network device may determine a WLAN offload policy by comprehensively considering both a local policy (that is, a network side policy) and a UE side policy, and send the determined WLAN offload policy to the UE by using a WLAN offload policy command Optionally, in the process of determining a WLAN offload policy, the target access network device may also consider the information about the target AP accessed by the UE.

Further, in addition to determining a WLAN offload policy according to the information about the target AP, the target access network device may also execute the following operations according to the information about the target AP: authenticating the target AP, that is, determining whether the UE is allowed to access the target AP; and/or allocating an IP address to the UE, and the like.

Step 703: The target access network device receives a WLAN offload policy acknowledgement sent by the UE.

Figure 8:
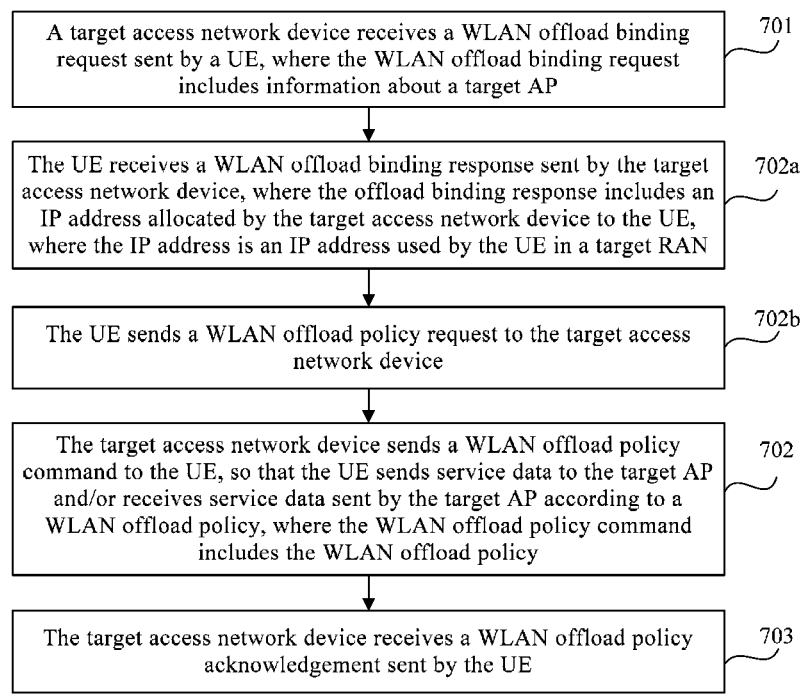
FIG. 8 is a flowchart of a handover method according to yet another embodiment of the present invention.

In an optional implementation manner of this embodiment, as shown in FIG. 8, before step 702, the method includes:

Step 702a: The UE receives a WLAN offload binding response sent by the target access network device, where the offload binding response includes an IP address allocated by the target access network device to the UE, and the IP address is an IP address used by the UE in the target RAN.

Step 702b: The UE sends a WLAN offload policy request to the target access network device.

The handover method provided in this embodiment is described from the perspective of a target access network device. In this embodiment, a target access network device does not need to send AP information corresponding to a target RAN to a UE, and can directly receive a WLAN offload binding request that is sent by the UE and includes information about a target AP, and further complete a RAN handover according to the WLAN offload binding request. The UE determines the information about the target AP according to AP information that is corresponding to the target RAN and sent by a source access network device. Unlike the prior art where handover to the target access network device needs to be first performed, and then the information about the target AP is determined according to the AP information that is corresponding to the target RAN and provided by the target access network device, this reduces time for determining the target AP, and helps reduce time of an entire handover process and reduce an impact of the handover process on service continuity. Further, in a case that the target AP needs to be accessed again, in this embodiment, the target AP can be accessed in time, which helps shorten time for re-establishing WLAN offload in the target RAN and ease a problem of packet loss or transmission interruption in a process of disconnecting from an original AP and accessing a target AP again; and the original sequential execution is changed to parallel execution, which further helps reduce time of an entire handover process and reduce an impact of the handover process on service continuity.

The following embodiments detail a RAN handover process in various cases.

Figure 9:
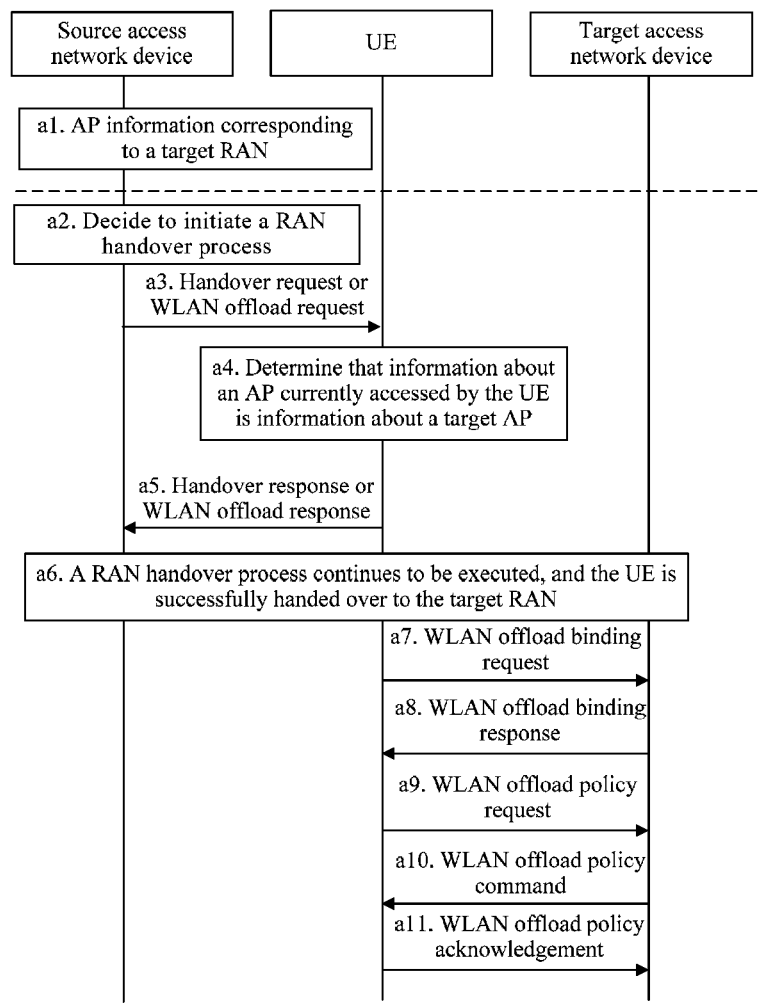
FIG. 9 is a complete flowchart of a RAN handover method according to an embodiment of the present invention.

FIG. 9 is a complete flowchart of a RAN handover method according to an embodiment of the present invention. In this embodiment, a source access network device acquires AP information corresponding to a target RAN before handover. As shown in FIG. 9, the method provided in this embodiment includes:

Step a1: A source access network device acquires AP information corresponding to a target RAN.

For a specific acquiring method, refer to the optional implementation manner provided in the embodiment shown in FIG. 2.

Step a2: The source access network device decides to initiate a RAN handover process.

Step a3: The source access network device sends a handover request or a WLAN offload request of a handover process to a UE.

The handover request or the WLAN offload request carries the AP information corresponding to the target RAN. Information about each AP includes but is not limited to an SSID, an authentication manner, a key management type, a password, and like information of the AP. The WLAN offload request may be sent together with the handover request, that is, the WLAN offload request is included in a handover request message; or the WLAN offload request is independently sent before the source access network device sends the handover request to the UE. If the WLAN offload request is independently sent before the source access network device sends the handover request to the UE, the WLAN offload request may carry a handover instruction.

It needs to be noted that the target RAN is one of adjacent RANs of a source RAN, and therefore the source access network device can select, from the acquired AP information corresponding to multiple adjacent RANs, the AP information corresponding to the target RAN, add the AP information corresponding to the target RAN to the handover request or the WLAN offload request of the handover process, and send the request to the UE.

Step a4: After receiving the handover request or the WLAN offload request of the handover process, the UE acquires the AP information corresponding to the target RAN from the request, and determines that information about an AP currently accessed by the UE is information about a target AP.

Specifically, if the AP information corresponding to the target RAN includes the information about the AP currently accessed by the UE, and quality of a link between the UE and the AP currently accessed by the UE is good, for example, a signal strength of the AP currently accessed by the UE is greater than a preset signal threshold, a connection with the currently accessed AP is retained. That is, the currently accessed AP is selected as the target AP, and it is determined that the information about the currently accessed AP is the information about the target AP. In other words, a current WLAN link is still used in the target RAN to perform data offload.

In this embodiment, description is made by assuming that the UE determines that the currently accessed AP is the target AP, that is, by using an example that the AP does not change.

It needs to be noted that, when the source access network device sends the AP information corresponding to the target RAN to the UE, the UE determines, by default, that the target access network device supports a RAN application-based WLAN Offload function. Based on this, the UE may directly send a WLAN offload binding request to the target access network device in a subsequent step.

Step a5: The UE sends a handover response or a WLAN offload response of a handover process to the source access network device.

Step a6: A RAN handover process continues to be executed, and the UE is successfully handed over to the target RAN.

Step a7: The UE sends a WLAN offload binding request to the target access network device.

The WLAN offload binding request carries information such as the information about the AP currently accessed by the UE (that is, the target AP) and a local IP address of the UE. The local IP address of the UE is an IP address allocated by a WLAN to the UE.

It needs to be noted that, if the target access network device does not support the RAN application-based WLAN Offload function, the target access network device may reject the WLAN offload binding request directly sent by the UE, or ignore the WLAN offload binding request. If the target access network device rejects the WLAN offload binding request, the target access network device may further add information such as an "unrecognizable packet" cause to a reject message. When the UE receives the reject message, or waiting for a reply times out, the UE may release a connection with the AP. In this case, the subsequent handover process may be performed according to the prior art, which is not described in this embodiment.

Step a8: The target access network device sends a WLAN offload binding response to the UE, where the WLAN offload binding response carries an IP address allocated by the target access network device to the UE.

Step a9: The UE sends a WLAN offload policy request to the target access network device, so as to negotiate on an offload priority, a granularity, and proportion information.

Step a10: The target access network device sends a WLAN offload policy command to the UE, where the WLAN offload policy command carries a WLAN offload policy.

The WLAN offload policy is decided by the target access network device by comprehensively considering both a local policy (that is, a network side policy) and a UE side policy.

Step a11: The UE sends a WLAN offload policy acknowledgement to the target access network device.

Then WLAN offload continues to be performed in the target RAN, that is, the target access network device sends, according to the determined WLAN offload policy, a part of data of an ongoing service of the UE to the UE through the AP currently accessed by the UE. In another embodiment, it may also be as follows: the UE transmits, according to the WLAN offload policy provided by the target access network device, a part of or all data flows through a WLAN connection established with the target AP.

It can be seen from the foregoing that, in this embodiment, in a RAN handover process, in a case that AP handover is not needed, a connection with a currently accessed AP is retained, and re-selecting and accessing a new AP are not performed, which simplifies a process in which a UE implements WLAN offload in a handover process of a 3GPP mobile communications network, shortens the time for establishing WLAN offload after handover, and helps improve service continuity and improve user experience.

Figure 10:
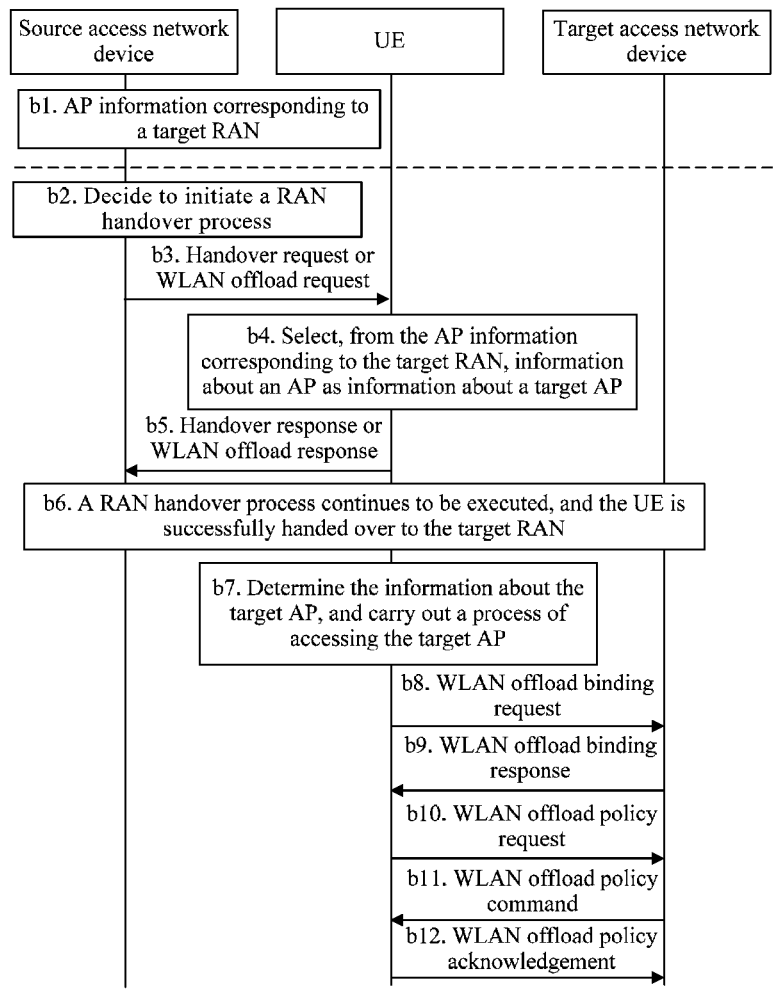
FIG. 10 is a complete flowchart of a RAN handover method according to another embodiment of the present invention.

FIG. 10 is a complete flowchart of a RAN handover method according to another embodiment of the present invention. In this embodiment, a source access network device acquires AP information corresponding to a target RAN before handover. As shown in FIG. 10, the method provided in this embodiment includes:

Step b1: A source access network device acquires AP information corresponding to a target RAN.

For a specific acquiring method, refer to the optional implementation manner provided in the embodiment shown in FIG. 2.

Step b2: The source access network device decides to initiate a RAN handover process.

Step b3: The source access network device sends a handover request or a WLAN offload request of a handover process to a UE.

The handover request or the WLAN offload request carries the AP information corresponding to the target RAN. Information about each AP includes but is not limited to an SSID, an authentication manner, a key management type, a password, and like information of the AP. The WLAN offload request may be sent together with the handover request, that is, the WLAN offload request is included in a handover request message; or the WLAN offload request is independently sent before the source access network device sends the handover request to the UE. If the WLAN offload request is independently sent before the source access network device sends the handover request to the UE, the WLAN offload request may carry a handover instruction.

It needs to be noted that the target RAN is one of adjacent RANs of a source RAN, and therefore the source access network device may select, from the acquired AP information corresponding to multiple adjacent RANs, the AP information corresponding to the target RAN, add the AP information corresponding to the target RAN to the handover request or the WLAN offload request of the handover process, and send the request to the UE.

Step b4: After receiving the handover request or the WLAN offload request of the handover process, the UE acquires the AP information corresponding to the target RAN from the request, and selects, from the AP information corresponding to the target RAN, information about an AP as the information about the target AP.

Specifically, if the AP information corresponding to the target RAN includes information about an AP currently accessed by the UE, but a link between the UE and the AP currently accessed by the UE is poor, for example, a signal strength of the AP currently accessed by the UE is smaller than a preset signal threshold, and data transmission cannot continue, or, if the AP information corresponding to the target RAN does not include the information about the AP currently accessed by the UE, the UE disconnects from a currently accessed AP.

In this embodiment, description is made by assuming that the UE determines that the currently accessed AP is not the target AP, that is, by using an example that the AP changes.

It needs to be noted that, when the source access network device sends the AP information corresponding to the target RAN to the UE, the UE determines, by default, that the target access network device supports a RAN application-based WLAN Offload function. Based on this, the UE may directly send a WLAN offload binding request to the target access network device in a subsequent step.

Step b5: The UE sends a handover response or a WLAN offload response of a handover process to the source access network device.

Step b6: A RAN handover process continues to be executed, and the UE is successfully handed over to the target RAN.

Step b7: The UE performs, according to the received AP information corresponding to the target RAN, WLAN scanning again, determines the information about the target AP, and carries out a process of accessing the target AP.

Specifically, if the AP information corresponding to the target RAN includes information about multiple APs, the UE enables WLAN scanning, and then attempts to access an AP among the multiple APs that has a strongest signal. If the AP information corresponding to the target RAN includes information about only one AP (in this embodiment, this AP is not the AP currently accessed by the UE), the UE directly attempts to access the AP.

It needs to be noted that, when being handed over to the target RAN, the UE executes WLAN scanning and the process of accessing the target AP at the same time, which means that steps b6 and b7 are executed at the same time, so as to shorten time for re-establishing WLAN offload in the target RAN.

Step b8: After successfully accessing the target AP, the UE sends a WLAN offload binding request to the target access network device.

The WLAN offload binding request carries information such as the information about the AP currently accessed by the UE (that is, the target AP) and a local IP address of the UE. The local IP address of the UE is an IP address allocated by a WLAN to the UE.

It needs to be noted that, if the target access network device does not support the RAN application-based WLAN Offload function, the target access network device may reject the WLAN offload binding request directly sent by the UE, or ignore the WLAN offload binding request. If the target access network device rejects the WLAN offload binding request, the target access network device may further add information such as an "unrecognizable packet" cause to a reject message. When the UE receives the reject message, or waiting for a reply times out, the UE may release a connection with the AP. In this case, the subsequent handover process may be performed according to the prior art, which is not described in this embodiment.

Step b9: The target access network device sends a WLAN offload binding response to the UE, where the WLAN offload binding response carries an IP address allocated by the target access network device to the UE.

Step b10: The UE sends a WLAN offload policy request to the target access network device, so as to negotiate on an offload priority, a granularity, and proportion information.

Step b11: The target access network device sends a WLAN offload policy command to the UE, where the WLAN offload policy command carries a WLAN offload policy.

The WLAN offload policy is decided by the target access network device by comprehensively considering both a local policy (that is, a network side policy) and a UE side policy.

Step b12: The UE sends a WLAN offload policy acknowledgement to the target access network device.

Then WLAN offload continues to be performed in the target RAN, that is, the target access network device sends, according to the determined WLAN offload policy, a part of data of an ongoing service of the UE to the UE through the AP currently accessed by the UE. In another embodiment, it may also be: the UE transmits, according to the WLAN offload policy provided by the target access network device, a part of or all data flows through a WLAN connection established with the target AP.

It can be seen from the foregoing description that, in this embodiment, in a RAN handover process, in a case that AP handover is needed, a process of handover to a target RAN and a process of accessing a new AP are executed at the same time, which simplifies a process in which a UE implements WLAN offload in a handover process of a 3GPP mobile communications network, shortens the time for establishing WLAN offload after handover, and helps improve service continuity and improve user experience.

Figure 11:
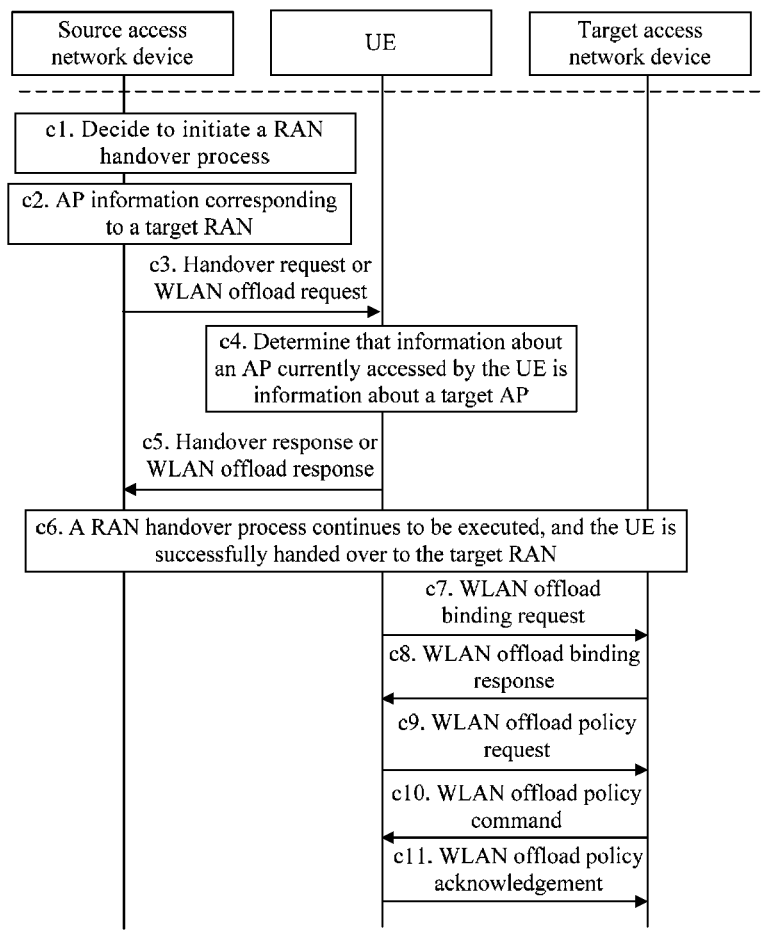
FIG. 11 is a complete flowchart of a RAN handover method according to still another embodiment of the present invention.

FIG. 11 is a complete flowchart of a RAN handover method according to still another embodiment of the present invention. In this embodiment, a source access network device acquires AP information corresponding to a target RAN in a handover process. As shown in FIG. 11, the method provided in this embodiment includes:

Step c1: A source access network device decides to initiate a RAN handover process.

Step c2: The source access network device acquires AP information corresponding to a target RAN.

For a specific acquiring method, refer to the optional implementation manner provided in the embodiment shown in FIG. 2.

Step c3: The source access network device sends a handover request or a WLAN offload request of a handover process to a UE.

The handover request or the WLAN offload request carries the AP information corresponding to the target RAN. Information about each AP includes but is not limited to an SSID, an authentication manner, a key management type, a password, and like information of the AP. The WLAN offload request may be sent together with the handover request, that is, the WLAN offload request is included in a handover request message; or the WLAN offload request is independently sent before the source access network device sends the handover request to the UE. If the WLAN offload request is independently sent before the source access network device sends the handover request to the UE, the WLAN offload request may carry a handover instruction.

It needs to be noted that the target RAN is one of adjacent RANs of a source RAN, and therefore the source access network device may select, from acquired AP information corresponding to multiple adjacent RANs, the AP information corresponding to the target RAN, add the AP information corresponding to the target RAN to the handover request or the WLAN offload request of the handover process, and send the request to the UE.

Step c4: After receiving the handover request or the WLAN offload request of the handover process sent by the source access network device, the UE acquires the AP information corresponding to the target RAN from the request, and determines that information about an AP currently accessed by the UE is information about a target AP.

Specifically, if the AP information corresponding to the target RAN includes the information about the AP currently accessed by the UE, and quality of a link between the UE and the AP currently accessed by the UE is good, for example, a signal strength of the AP currently accessed by the UE is greater than a preset signal threshold, a connection with the currently accessed AP is retained. That is, the currently accessed AP is selected as the target AP, and it is determined that the information about the currently accessed AP is the information about the target AP. In other words, a current WLAN link is still used in the target RAN to perform data offload.

In this embodiment, description is made by assuming that the UE determines that the currently accessed AP is the target AP, that is, by using an example that the AP does not change.

It needs to be noted that, when the source access network device sends the AP information corresponding to the target RAN to the UE, the UE determines, by default, that the target access network device supports a RAN application-based WLAN Offload function. Based on this, the UE may directly send a WLAN offload binding request to the target access network device in a subsequent step.

Step c5: The UE sends a handover response or a WLAN offload response of a handover process to the source access network device.

Step c6: A RAN handover process continues to be executed, and the UE is successfully handed over to the target RAN.

Step c7: The UE sends a WLAN offload binding request to the target access network device.

The WLAN offload binding request carries information such as the information about the AP currently accessed by the UE (that is, the target AP) and a local IP address of the UE. The local IP address of the UE is an IP address allocated by a WLAN to the UE.

It needs to be noted that, if the target access network device does not support the RAN application-based WLAN Offload function, the target access network device may reject the WLAN offload binding request directly sent by the UE, or ignore the WLAN offload binding request. If the target access network device rejects the WLAN offload binding request, the target access network device may further add information such as an "unrecognizable packet" cause to a reject message. When the UE receives the reject message, or waiting for a reply times out, the UE may release a connection with the AP. In this case, the subsequent handover process may be performed according to the prior art, which is not described in this embodiment.

Step c8: The target access network device sends a WLAN offload binding response to the UE, where the WLAN offload binding response carries an IP address allocated by the target access network device to the UE.

Step c9: The UE sends a WLAN offload policy request to the target access network device, so as to negotiate on an offload priority, a granularity, and proportion information.

Step c10: The target access network device sends a WLAN offload policy command to the UE, where the WLAN offload policy command carries a WLAN offload policy.

The WLAN offload policy is decided by the target access network device by comprehensively considering both a local policy (that is, a network side policy) and a UE side policy.

Step c11: The UE sends a WLAN offload policy acknowledgement to the target access network device.

Then WLAN offload continues to be performed in the target RAN, that is, the target access network device sends, according to the determined WLAN offload policy, a part of data of an ongoing service of the UE to the UE through the AP currently accessed by the UE. In another embodiment, it may also be: the UE transmits, according to the WLAN offload policy provided by the target access network device, a part of or all data flows through a WLAN connection established with the target AP.

It can be seen from the foregoing description that a difference between this embodiment and the embodiment shown in FIG. 9 is as follows: orders for a source access network device to acquire AP information corresponding to a target RAN and the source access network device to initiate a RAN handover process are different. In this embodiment, in a RAN handover process, in a case that AP handover is needed, a connection with a currently accessed AP is retained, and re-selecting and accessing a new AP are not performed, which simplifies a process in which a UE implements WLAN offload in a handover process of a 3GPP mobile communications network, shortens the time for establishing WLAN offload after handover, and helps improve service continuity and improve user experience.

Figure 12:
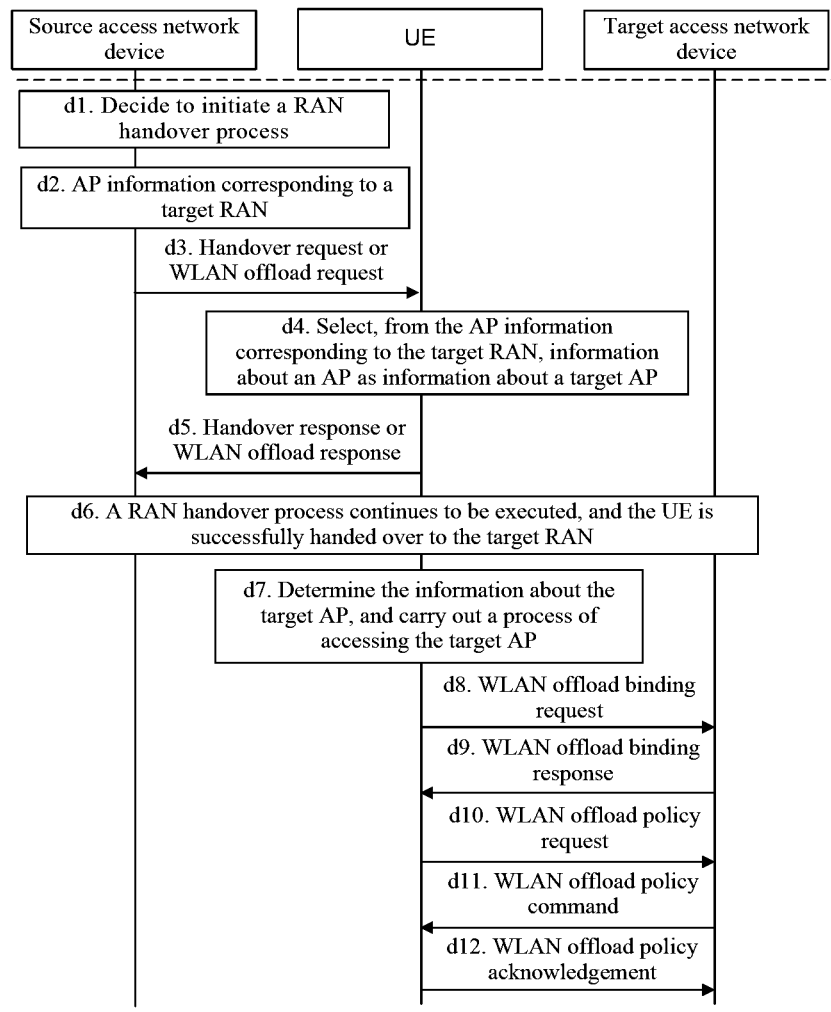
FIG. 12 is a complete flowchart of a RAN handover method according to yet another embodiment of the present invention.

FIG. 12 is a complete flowchart of a RAN handover method according to yet another embodiment of the present invention. In this embodiment, a source access network device acquires AP information corresponding to a target RAN in a handover process. As shown in FIG. 12, the method provided in this embodiment includes:

Step d1: A source access network device decides to initiate a RAN handover process.

Step d2: The source access network device acquires AP information corresponding to a target RAN.

For a specific acquiring method, refer to the optional implementation manner provided in the embodiment shown in FIG. 2.

Step d3: The source access network device sends a handover request or a WLAN offload request of a handover process to a UE.

The handover request or the WLAN offload request carries the AP information corresponding to the target RAN. Information about each AP includes but is not limited to an ESSID, a BSSID, an authentication manner, a key management type, a password, and like information of the AP. The WLAN offload request may be sent together with the handover request, that is, the WLAN offload request is included in a handover request message; or the WLAN offload request is independently sent before the source access network device sends the handover request to the UE. If the WLAN offload request is independently sent before the source access network device sends the handover request to the UE, the WLAN offload request may carry a handover instruction.

It needs to be noted that the target RAN is one of adjacent RANs of a source RAN, and therefore the source access network device may select, from acquired AP information corresponding to multiple adjacent RANs, the AP information corresponding to the target RAN, add the AP information corresponding to the target RAN to the handover request or the WLAN offload request of the handover process, and send the request to the UE.

Step d4: After receiving the handover request or the WLAN offload request of the handover process sent by the source access network device, the UE acquires the AP information corresponding to the target RAN from the request, and selects, from the AP information corresponding to the target RAN, information about an AP as information about a target AP.

Specifically, if the AP information corresponding to the target RAN includes information about an AP currently accessed by the UE, but a link between the UE and the AP currently accessed by the UE is poor, for example, a signal strength of the AP currently accessed by the UE is smaller than a preset signal threshold, and data transmission cannot continue, or, if the AP information corresponding to the target RAN does not include the information about the AP currently accessed by the UE, the UE disconnects from the currently accessed AP.

In this embodiment, description is made by assuming that the UE determines that the currently accessed AP is not the target AP, that is, by using an example that the AP changes.

It needs to be noted that, when the source access network device sends the AP information corresponding to the target RAN to the UE, the UE determines, by default, that the target access network device supports a RAN application-based WLAN Offload function. Based on this, the UE may directly send a WLAN offload binding request to the target access network device in a subsequent step.

Step d5: The UE sends a handover response or a WLAN offload response of a handover process to the source access network device.

Step d6: A RAN handover process continues to be executed, and the UE is successfully handed over to the target RAN.

Step d7: The UE performs, according to the received AP information corresponding to the target RAN, WLAN scanning again, determines the information about the target AP, and carries out a process of accessing the target AP.

Specifically, if the AP information corresponding to the target RAN includes information about multiple APs, the UE enables WLAN scanning, and then attempts to access an AP among the multiple APs that has a strongest signal. If the AP information corresponding to the target RAN includes information about only one AP (in this embodiment, the AP is not the AP currently accessed by the UE), the UE directly attempts to access the AP.

It needs to be noted that, when being handed over to the target RAN, the UE executes WLAN scanning and the process of accessing the target AP at the same time, which means that steps d6 and d7 are executed at the same time, so as to shorten time for re-establishing WLAN offload in the target RAN.

Step d8: After successfully accessing the target AP, the UE sends a WLAN offload binding request to the target access network device.

The WLAN offload binding request carries information such as the information about the AP currently accessed by the UE (that is, the target AP) and a local IP address of the UE. The local IP address of the UE is an IP address allocated by a WLAN to the UE.

It needs to be noted that, if the target access network device does not support the RAN application-based WLAN Offload function, the target access network device may reject the WLAN offload binding request directly sent by the UE, or ignore the WLAN offload binding request. If the target access network device rejects the WLAN offload binding request, the target access network device may further add information such as an "unrecognizable packet" cause to a reject message. When the UE receives the reject message, or waiting for a reply times out, the UE may release a connection with the AP. In this case, the subsequent handover process may be performed according to the prior art, which is not described in this embodiment.

Step d9: The target access network device sends a WLAN offload binding response to the UE, where the WLAN offload binding response carries an IP address allocated by the target access network device to the UE.

Step d10: The UE sends a WLAN offload policy request to the target access network device, so as to negotiate on an offload priority, a granularity, and proportion information.

Step d11: The target access network device sends a WLAN offload policy command to the UE, where the WLAN offload policy command carries a WLAN offload policy.

The WLAN offload policy is decided by the target access network device by comprehensively considering both a local policy (that is, a network side policy) and a UE side policy.

Step d12: The UE sends a WLAN offload policy acknowledgement to the target access network device.

Then WLAN offload continues to be performed in the target RAN, that is, the target access network device sends, according to the determined WLAN offload policy, a part of data of an ongoing service of the UE to the UE through the AP currently accessed by the UE. In another embodiment, it may also be: the UE transmits, according to the WLAN offload policy provided by the target access network device, a part of or all data flows through a WLAN connection established with the target AP.

It can be seen from the foregoing that a difference between this embodiment and the embodiment shown in FIG. 10 is as follows: orders for a source access network device to acquire AP information corresponding to a target RAN and the source access network device to initiate a RAN handover process is different. In this embodiment, in a case that AP handover is needed, a process of handover to a target RAN and a process of accessing a new AP are executed at the same time, which simplifies a process in which a UE implements WLAN offload in a handover process of a 3GPP mobile communications network, shortens the time for establishing WLAN offload after handover, and helps improve service continuity and improve user experience.

Figure 13:
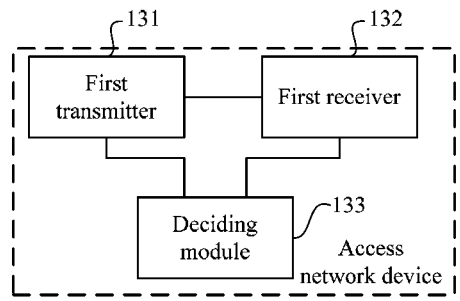
FIG. 13 is a schematic structural diagram of an access network device according to an embodiment of the present invention.

FIG. 13 is a schematic structural diagram of an access network device according to an embodiment of the present invention. As shown in FIG. 13, the access network device provided in this embodiment includes: a first transmitter 131 and a first receiver 132.

The first transmitter 131 is configured to send a handover request or a WLAN offload request to a UE, so that the UE determines information about a target AP according to AP information corresponding to a target RAN and information about an AP currently accessed by the UE, and sends a WLAN offload binding request carrying the information about the target AP to a target access network device in the target RAN, so as to complete a RAN handover. The handover request or the WLAN offload request includes the AP information corresponding to the target RAN. The AP information corresponding to the target RAN is information about an AP in a WLAN that covers, together with the target RAN, a location of the UE.

The first receiver 132 is configured to, after the first transmitter 131 sends the handover request or the WLAN offload request, receive a handover response or a WLAN offload response returned by the UE.

In an optional implementation manner of this embodiment, the first transmitter 131 is further configured to send a first WLAN information request to the target access network device before sending the handover request or the WLAN offload request. Correspondingly, the first receiver 132 is further configured to, after the first transmitter 131 sends the first WLAN information request, receive a first WLAN information response returned by the target access network device, where the first WLAN information response includes the AP information corresponding to the target RAN.

Further, optionally, the first WLAN information request may include AP information corresponding to a source RAN and/or instruction information requesting the AP information corresponding to the target RAN; and the source RAN is a RAN to which a source access network device belongs.

In an optional implementation manner of this embodiment, the first transmitter 131 is further configured to send a second WLAN information request to a server before sending the handover request or the WLAN offload request, where the second WLAN information request includes an identifier of the target access network device. Correspondingly, the first receiver 132 is further configured to, after the first transmitter 131 sends the second WLAN information request, receive a second WLAN information response returned by the server, where the second WLAN information response includes the AP information corresponding to the target RAN, which is acquired by the server by querying according to the identifier of the target access network device.

In an optional implementation manner of this embodiment, as shown in FIG. 13, the access network device provided in this embodiment further includes a deciding module 133. The deciding module 133 is configured to decide to initiate a RAN handover process. Optionally, the deciding module 133 may decide to initiate a RAN handover process before the first transmitter 131 sends the first WLAN information request to the target access network device or sends the second WLAN information request to the server; or, the deciding module 133 may decide to initiate a RAN handover process after the first receiver 132 receives the first WLAN information request or the second WLAN information response. Optionally, the deciding module 133 connects to the first transmitter 131 and the first receiver 132.

The access network device provided in this embodiment may be an RNC in a macro site scenario, or may be an NB in a small-cell base station scenario.

Functional modules of the access network device provided in this embodiment may be configured to execute a corresponding process in the handover method embodiment shown in FIG. 1 or FIG. 2. Specific operating principles of the functional modules are not repeatedly described herein. For details, refer to the description of the method embodiments.

The access network device provided in this embodiment, as a source access network device, sends acquired AP information corresponding to a target RAN to a UE by using a handover request or a WLAN offload request, so that the UE can determine information about a target AP according to AP information that is corresponding to the target RAN and provided by the source access network device and information about an AP currently accessed by the UE, add the information about the target AP to a WLAN offload binding request, and send the WLAN offload binding request to a target access network device, so as to complete a RAN handover. Unlike the prior art where handover to the target access network device needs to be first performed, and then the information about the target AP is determined according to AP information that is corresponding to the target RAN and provided by the target access network device, this reduces time for determining the target AP, and helps reduce time of an entire handover process and reduce an impact of the handover process on service continuity.

Further, the access network device provided in this embodiment sends the AP information corresponding to the target RAN to the UE, so that the UE can access the target AP in time in a case that the UE needs to access the target AP again, which helps shorten time for re-establishing WLAN offload in the target RAN and ease a problem of packet loss or transmission interruption in a process of disconnecting from an original AP and accessing a target AP again; and the original sequential execution is changed to parallel execution, which further helps reduce time of an entire handover process and reduce an impact of the handover process on service continuity.

Figure 14:
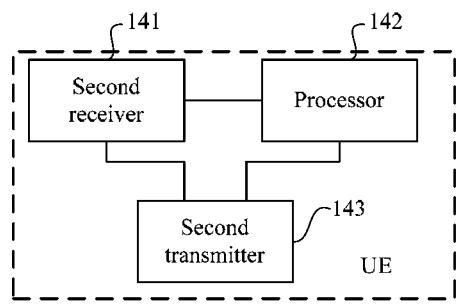
FIG. 14 is a schematic structural diagram of a UE according to an embodiment of the present invention.

FIG. 14 is a schematic structural diagram of a UE according to an embodiment of the present invention. As shown in FIG. 14, the UE provided in this embodiment includes: a second receiver 141, a processor 142, and a second transmitter 143.

The second receiver 141 is configured to receive a handover request or a WLAN offload request sent by a source access network device. The handover request or the WLAN offload request includes AP information corresponding to a target RAN. The target RAN is a RAN to which a target access network device belongs. The AP information corresponding to the target RAN is information about APs in a WLAN that covers, together with the target RAN, a location of the UE.

The processor 142 connects to the second receiver 141 and is configured to receive the handover request or the WLAN offload request from the second receiver 141, and determine information about a target AP according to the AP information corresponding to the target RAN in the handover request or the WLAN offload request and information about an AP currently accessed by the UE.

The second transmitter 143 connects to the processor 142 and the second receiver 141 and is configured to send a handover response or a WLAN offload response to the source access network device after the second receiver 141 receives the handover request or the WLAN offload request, and send a WLAN offload binding request to the target access network device after the processor 142 determines the information about the target AP, so as to complete a RAN handover, where the WLAN offload binding request includes the information about the target AP.

In an optional implementation manner of this embodiment, the processor 142 may be specifically configured to: if the AP information corresponding to the target RAN includes the information about the AP currently accessed by the UE, and a signal strength of the AP currently accessed by the UE is greater than or equal to a preset signal threshold, retain a connection between the UE and the AP currently accessed by the UE, and determine that the information about the AP currently accessed by the UE is the information about the target AP; and if the AP information corresponding to the target RAN does not include the information about the AP currently accessed by the UE, or the AP information corresponding to the target RAN includes the information about the AP currently accessed by the UE but the signal strength of the AP currently accessed by the UE is smaller than the preset signal threshold, disconnect the connection between the UE in this embodiment and the AP currently accessed by the UE in this embodiment, and select, from the AP information corresponding to the target RAN, information about an AP not currently accessed by the UE as the information about the target AP.

Further, optionally, the processor 142 is more specifically configured to perform WLAN scanning, so as to acquire signal strengths of APs that correspond to AP information in the AP information corresponding to the target RAN; and select, from the AP information corresponding to the target RAN, information about an AP that has a greatest signal strength and that is not currently accessed by the UE as the information about the target AP.

In an optional implementation manner of this embodiment, the processor 142 may be further configured to, when the information about the target AP is the information that is selected by the processor 142 from the AP information corresponding to the target RAN and is the information about an AP not currently accessed by the UE and when being handed over to the target access network device, execute, according to the information about the target AP, a process of accessing the target AP.

In an optional implementation manner of embodiment, the second receiver 141 is further configured to receive a WLAN offload policy command sent by the target access network device, and receive, according to a WLAN offload policy, service data sent by the target AP, where the WLAN offload policy command includes the WLAN offload policy. Correspondingly, the second transmitter 143 is further configured to send a WLAN offload policy acknowledgement to the target access network device after the second receiver 141 receives the WLAN offload policy command.

Further, optionally, the second receiver 141 is further configured to, before receiving the WLAN offload policy command sent by the target access network device, receive a WLAN offload binding response sent by the target access network device, and send, according to the WLAN offload policy, service data to the target AP.

Further, optionally, the second transmitter 143 is further configured to send a WLAN offload policy request to the target access network device before the second receiver 141 receives the WLAN offload policy command.

The UE provided in this embodiment receives AP information that is corresponding to a target RAN and sent by a source access network device by using a handover request or a WLAN offload request, determines information about a target AP according to the AP information that is corresponding to the target RAN and provided by the source access network device and information about an AP currently accessed by the UE, adds the information about the target AP to a WLAN offload binding request, and sends the WLAN offload binding request to a target access network device, so as to complete a RAN handover. Unlike the prior art where handover to the target access network device needs to be first performed, and then the information about the target AP is determined according to AP information that is corresponding to the target RAN and provided by the target access network device, this reduces time for determining the target AP, and helps reduce time of an entire handover process and reduce an impact of the handover process on service continuity.

Further, in a case that the UE provided in this embodiment needs to access a target AP again, the UE can access the target AP in time, which helps shorten time for re-establishing WLAN offload in the target RAN and ease a problem of packet loss or transmission interruption in a process of disconnecting from an original AP and accessing a target AP again; and the original sequential execution is changed to parallel execution, which further helps reduce time of an entire handover process and reduce an impact of a handover process on service continuity.

Figure 15:
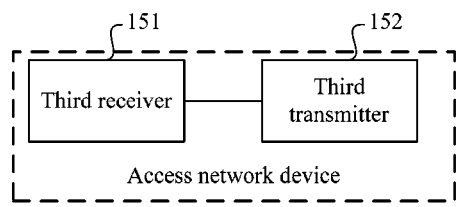
FIG. 15 is a schematic structural diagram of an access network device according to another embodiment of the present invention.

FIG. 15 is a schematic structural diagram of an access network device according to another embodiment of the present invention. As shown in FIG. 15, the access network device provided in this embodiment includes: a third receiver 151 and a third transmitter 152.

The third receiver 151 is configured to receive a WLAN offload binding request sent by a UE, where the WLAN offload binding request includes information about a target AP. The information about the target AP is determined by the UE according to AP information that is corresponding to a target RAN and sent by a source access network device and information about an AP currently accessed by the UE; the target RAN is a RAN to which the target access network device belongs; and the AP information corresponding to the target RAN is information about an AP in a WLAN that covers, together with the target RAN, a location of the UE.

The third transmitter 152 is configured to send a WLAN offload policy command to the UE, so that the UE sends service data to the target AP and/or receives service data sent by the target AP according to a WLAN offload policy, where the WLAN offload policy command includes the WLAN offload policy.

The third receiver 152 is further configured to, after the third transmitter 151 sends the WLAN offload policy command, receive a WLAN offload policy acknowledgement sent by the UE.

Optionally, the third receiver 152 connects to the third transmitter 151.

The access network device provided in this embodiment, as a target access network device, can be configured to execute a corresponding process in the method embodiment shown in FIG. 7 or FIG. 8. A specific operating principle of the access network device is not repeatedly described herein. For details, refer to the description of the method embodiments.

The target access network device provided in this embodiment does not need to send AP information corresponding to a target RAN to a UE, and can directly receive a WLAN offload binding request that is sent by the UE and includes information about a target AP, and further complete a RAN handover according to the WLAN offload binding request. The UE determines the information about the target AP according to the AP information that is corresponding to the target RAN and sent by a source access network device. Unlike the prior art where handover to the target access network device needs to be first performed, and then the information about the target AP is determined according to AP information that is corresponding to the target RAN and provided by the target access network device, this reduces time for determining the target AP, and helps reduce time of an entire handover process and reduce an impact of the handover process on service continuity.

Figure 16:
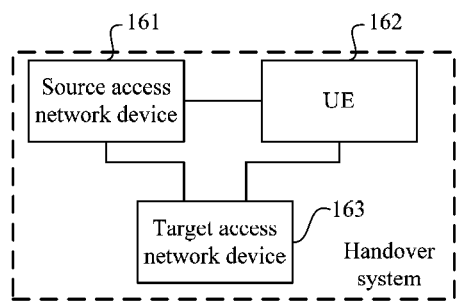
FIG. 16 is a schematic structural diagram of a handover system according to an embodiment of the present invention.

FIG. 16 is a schematic structural diagram of a handover system according to an embodiment of the present invention. As shown in FIG. 16, the system provided in this embodiment includes: a source access network device 161, a UE 162, and a target access network device 163. The source access network device 161 connects to the UE 162 and the target access network device 163, and the UE 162 further connects to the target access network device 163.

The source access network device 161 may be the access network device provided in FIG. 13, and an operating principle and a structure of the source access network device 161 are not repeatedly described herein. The UE 162 may be the UE provided in FIG. 14, and an operating principle and a structure of the UE 162 are not repeatedly described herein. The target access network device 163 may be the access network device provided in FIG. 15, and an operating principle and a structure of the target access network device 163 are not repeatedly described herein.

The handover system provided in this embodiment can execute the procedures provided in the foregoing method embodiments, and in a process of handover from a source access network device to a target access network device, the source access network device provides, for a UE, AP information corresponding to a target RAN to which the target access network device belongs, so that the UE can determine information about a target AP according to the AP information that is corresponding to the target RAN and provided by the source access network device and information about an AP currently accessed by the UE, add the information about the target AP to a WLAN offload binding request, and send the WLAN offload binding request to the target access network device, so as to complete a RAN handover. Unlike the prior art where handover to the target access network device needs to be first performed, and the information about the target AP is determined according to AP information that is corresponding to the target RAN and provided by the target access network device, this reduces time for determining the target AP, and helps reduce time of an entire handover process and reduce an impact of a handover process on service continuity.

Persons of ordinary skill in the art can understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention rather than limiting the present invention. Although the present invention is detailed with reference to the foregoing embodiments, persons of ordinary skill in the art should understand that they may still make modifications to the technical solutions described in the foregoing embodiments or make equivalent replacements to a part of or all technical features of the technical solutions; and these modifications or replacements do not make the essence of corresponding technical solutions depart from the scope of the technical solutions of the embodiments of the present invention.

What is claimed is:

1. A handover method, comprising:
sending, by a source radio access network (RAN) device, a handover request or a wireless local area network (WLAN) offload request to a user equipment (UE), to enable the UE to determine, while the UE performs a RAN handover from a source RAN to a target RAN, information about a target access point (AP) according to AP information corresponding to the target RAN and according to information about a currently accessed AP, and to enable the UE to send a WLAN offload binding request carrying the information about the target AP to a target access network device in the target RAN, wherein the handover request or the WLAN offload request comprises the AP information corresponding to the target RAN, and the AP information corresponding to the target RAN includes information about at least one AP in at least one WLAN that covers, together with the target RAN, a location of the UE, the source RAN is a RAN to which the source RAN device belongs; and
receiving, by the source RAN device, a handover response or a WLAN offload response returned by the UE.

2. The handover method according to claim 1, before the sending, by the source RAN device, the handover request or the wireless local area network WLAN offload request to the UE, comprising:
sending, by the source RAN device, a first WLAN information request to the target access network device; and
receiving, by the source RAN device, a first WLAN information response returned by the target access network device, wherein the first WLAN information response comprises the AP information corresponding to the target RAN.

3. The handover method according to claim 2, wherein the first WLAN information request comprises AP information corresponding to the source RAN or instruction information requesting the AP information corresponding to the target RAN.

4. The handover method according to claim 2, wherein before the sending, by the source RAN device, the handover request or the wireless local area network WLAN offload request to the UE, the method comprises:
deciding, by the source RAN device, to initiate a RAN handover process.

5. The handover method according to claim 2, wherein the handover request or the WLAN offload request instructs the UE to perform the RAN handover from the source RAN to the target RAN.

6. The handover method according to claim 1, before the sending, by the source RAN device, the handover request or the wireless local area network WLAN offload request to the UE, comprising:
sending, by the source RAN device, a second WLAN information request to a server, wherein the second WLAN information request comprises an identifier of the target access network device; and
receiving, by the source RAN device, a second WLAN information response returned by the server, wherein the second WLAN information response comprises the AP information corresponding to the target RAN, which is acquired by the server by querying according to the identifier of the target access network device.

7. A handover method, comprising:
receiving, by a user equipment (UE), a handover request or a wireless local area network (WLAN) offload request sent by a source radio access network (RAN) device, wherein the handover request or the WLAN offload request comprises access point (AP) information corresponding to a target RAN, the target RAN is a RAN to which a target access network device belongs, and the AP information corresponding to the target RAN includes information about at least one AP in at least one WLAN that covers, together with the target RAN, a location of the UE;
performing, by the UE, a RAN handover from a source RAN to the target RAN, wherein the source RAN is a RAN to which the source RAN device belongs;
determining, by the UE, information about a target AP according to the AP information corresponding to the target RAN and according to information about an AP currently accessed by the UE while the UE performs the RAN handover;
sending, by the UE, a handover response or a WLAN offload response to the source RAN device; and
sending, by the UE, a WLAN offload binding request to the target access network device in the target RAN, wherein the WLAN offload binding request comprises the information about the target AP.

8. The handover method according to claim 7, wherein the determining, by the UE, the information about the target AP according to the AP information corresponding to the target RAN and according to the information about the AP currently accessed by the UE comprises:
if the AP information corresponding to the target RAN comprises the information about the AP currently accessed by the UE, and a signal strength of the AP currently accessed by the UE is greater than or equal to a preset signal threshold, retaining, by the UE, a connection with the AP currently accessed by the UE, and determining that the information about the AP currently accessed by the UE is the information about the target AP; and
if the AP information corresponding to the target RAN does not comprise the information about the AP currently accessed by the UE, or the AP information corresponding to the target RAN comprises the information about the AP currently accessed by the UE but the signal strength of the AP currently accessed by the UE is smaller than the preset signal threshold, disconnecting, by the UE, from the AP currently accessed by the UE, and selecting, from the AP information corresponding to the target RAN, information about an AP not currently accessed by the UE as the information about the target AP.

9. The handover method according to claim 8, wherein the selecting, by the UE, from the AP information corresponding to the target RAN, information about an AP not currently accessed by the UE as the information about the target AP comprises:
performing, by the UE, WLAN scanning, so as to acquire signal strengths of APs that correspond to APs included in the AP information corresponding to the target RAN; and
selecting, by the UE, from the AP information corresponding to the target RAN, information about an AP that has a greatest signal strength of the at least one AP included in the AP information and that is not currently accessed by the UE as the information about the target AP.

10. The handover method according to claim 8, further comprising:
if the information about the target AP is the information that is selected by the UE from the AP information corresponding to the target RAN and is the information about an AP not currently accessed by the UE, executing, by the UE, according to the information about the target AP when being handed over to the target access network device, a process of accessing the target AP.

11. The handover method according to claim 7, further comprising:
receiving, by the UE, a WLAN offload policy command sent by the target access network device, wherein the WLAN offload policy command comprises a WLAN offload policy;
sending, by the UE, a WLAN offload policy acknowledgement to the target access network device; and
sending, by the UE, service data to the target AP and receiving service data sent by the target AP according to the WLAN offload policy.

12. The handover method according to claim 7, wherein the handover request or the WLAN offload request instructs the UE to perform the RAN handover from the source RAN to the target RAN.

13. The handover method according to claim 7, wherein the sending, by the UE, the WLAN offload binding request to the target access network device occurs after the UE is successfully handed over to the target RAN.

14. A radio access network (RAN) device, comprising:
a first transmitter, configured to send a handover request or a wireless local area network (WLAN) offload request to a user equipment (UE), to enable the UE to determine, while the UE performs a RAN handover from a source RAN to a target RAN, information about a target access point (AP) according to AP information corresponding to the target (RAN) and according to information about a currently accessed AP, and to enable the UE to send a WLAN offload binding request carrying the information about the target AP to a target access network device in the target RAN, wherein the handover request or the WLAN offload request comprises the AP information corresponding to the target RAN, and the AP information corresponding to the target RAN includes information about at least one AP in at least one WLAN that covers, together with the target RAN, a location of the UE, the source RAN is a RAN to which the RAN device belongs; and
a first receiver, configured to, after the first transmitter sends the handover request or the WLAN offload request, receive a handover response or a WLAN offload response returned by the UE.

15. The RAN device according to claim 14, wherein the first transmitter is further configured to sent a first WLAN information request to the target access network device before sending the handover request or the WLAN offload request; and
the first receiver is further configured to, after the first transmitter sends the first WLAN information request, receive a first WLAN information response returned by the target access network device, wherein the first WLAN information response comprises the AP information corresponding to the target RAN.

16. The RAN device according to claim 15, wherein the first WLAN information request comprises AP information corresponding to the source RAN or instruction information requesting the AP information corresponding to the target RAN, and the source RAN is a RAN to which the RAN device belongs.

17. The RAN device according to claim 15, further comprising:
a deciding module, configured to decide to initiate a RAN handover process before the first transmitter sends the handover request or the WLAN offload request.

18. The RAN device according to claim 14, wherein the first transmitter is further configured to send a first WLAN information request to the target access network device before sending the handover request or the WLAN offload request; and
the first transmitter is further configured to send a second WLAN information request to a server before sending the handover request or the WLAN offload request, wherein the second WLAN information request comprises an identifier of the target access network device; and
the first receiver is further configured to, after the first transmitter sends the second WLAN information request, receive a second WLAN information response returned by the server, wherein the second WLAN information response comprises the AP information corresponding to the target RAN, which is acquired by the server by querying according to the identifier of the target access network device.

19. The access network device according to claim 14, wherein the handover request or the WLAN offload request instructs the UE to perform the RAN handover from the source RAN to the target RAN.

20. A user equipment (UE), comprising:
a receiver, configured to receive a handover request or a wireless local area network (WLAN) offload request sent by a source radio access network (RAN) device, wherein the handover request or the WLAN offload request comprises access point (AP) information corresponding to a target RAN, the target RAN is a RAN to which a target access network device belongs, and the AP information corresponding to the target RAN includes information about at least one AP in at least one WLAN that covers, together with the target RAN, a location of the UE;
a processor, configured to receive the handover request or the WLAN offload request from the receiver, performing, by the UE, a RAN handover from the source RAN to the target RAN, wherein the source RAN is a RAN to which the source RAN device belongs, and determine information about a target AP according to the AP information corresponding to the target RAN in the handover request or the WLAN offload request and according to information about an AP currently accessed by the UE while the UE performs the RAN handover; and
a transmitter, configured to, after the receiver receives the handover request or the WLAN offload request, send a handover response or a WLAN offload response to the source RAN device, and after the processor determines the information about the target AP, send a WLAN offload binding request to the target access network device in the target RAN, wherein the WLAN offload binding request comprises the information about the target AP.

21. The UE according to claim 20, wherein the processor is configured to: if the AP information corresponding to the target RAN comprises the information about the AP currently accessed by the UE, and a signal strength of the AP currently accessed by the UE is greater than or equal to a preset signal threshold, retain a connection between the UE and the AP currently accessed by the UE, and determine that the information about the AP currently accessed by the UE is the information about the target AP; and if the AP information corresponding to the target RAN does not comprise the information about the AP currently accessed by the UE, or the AP information corresponding to the target RAN comprises the information about the AP currently accessed by the UE but the signal strength of the AP currently accessed by the UE is smaller than the preset signal threshold, disconnect the connection between the UE and the AP currently accessed by the UE, and select, from the AP information corresponding to the target RAN, information about an AP not currently accessed by the UE as the information about the target AP.

22. The UE according to claim 21, wherein the processor is configured to perform WLAN scanning, so as to acquire signal strengths of APs that correspond to APs included in the AP information corresponding to the target RAN; and select, from the AP information corresponding to the target RAN, information about an AP that has a greatest signal strength of the at least one AP included in the AP information and is not currently accessed by the UE as the information about the target AP.

23. The UE according to claim 21, wherein the processor is further configured to, when the information about the target AP is the information that is selected by the processor from the AP information corresponding to the target RAN and is the information about an AP not currently accessed by the UE, execute, according to the information about the AP when being handed over to the target access network device, a process of accessing the target AP.

24. The UE according to claim 20, wherein the receiver is further configured to receive a WLAN offload policy command sent by the target access network device, and receive, according to a WLAN offload policy, service data sent by the target AP, wherein the WLAN offload policy command comprises the WLAN offload policy; and the transmitter is further configured to, after the receiver receives the WLAN offload policy command, send a WLAN offload policy acknowledgement to the target access network device, and send, according to the WLAN offload policy, service data to the target AP.

25. The UE according to claim 20, wherein the handover request or the WLAN offload request instructs the UE to perform the RAN handover from the source RAN to the target RAN.

26. The UE according to claim 20, wherein the sending, by the UE, the WLAN offload binding request to the target access network device occurs after the UE is successfully handed over to the target RAN.

* * * * *